(12) United States Patent     (10) Patent No.: US 8,731,319 B2
Lorenz et al.     (45) Date of Patent: May 20, 2014

(54) IMAGE LAYER STACK INTERFACE

(75) Inventors: Jon Lorenz, San Francisco, CA (US); Tyler Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1290 days.

(21) Appl. No.: 12/146,010

(22) Filed: Jun. 25, 2008

(65) Prior Publication Data

US 2014/0029868 A1    Jan. 30, 2014

(51) Int. Cl.
*G06K 9/40*    (2006.01)

(52) U.S. Cl.
USPC ........... 382/260; 382/302; 382/239; 382/276; 375/619; 375/630

(58) Field of Classification Search
USPC ................ 382/260, 276, 154, 305, 284, 294; 345/629, 589, 157, 619, 660, 649; 348/419, 650, 653
See application file for complete search history.

(56) References Cited

U.S. PATENT DOCUMENTS

| | | | | |
|---|---|---|---|---|
| 7,600,183 | B2* | 10/2009 | Stern et al. | 715/243 |
| 7,616,834 | B2* | 11/2009 | Kramer et al. | 382/276 |
| 2005/0180645 | A1* | 8/2005 | Hasegawa et al. | 382/239 |
| 2005/0195216 | A1* | 9/2005 | Kramer et al. | 345/619 |
| 2006/0098029 | A1* | 5/2006 | Clas | 345/629 |
| 2007/0109284 | A1* | 5/2007 | Yamazaki et al. | 345/204 |
| 2009/0027418 | A1* | 1/2009 | Maru et al. | 345/629 |

OTHER PUBLICATIONS

Peter Bauer, "Special Edition Using® Adobe® Photoshop® CS and Illustrator® CS", Chapters 10, pp. 338-385, chapter 30, pp. 1014-1039, Pub. Date: Feb. 13, 2004.*
Jim Babbage, "A glance at Photoshop integration with Fireworks", URL:<www.adobe.com/designcenter/fireworks/.../frw9at_pshopimport.html>,published Apr. 16, 2007, pp. 10.*
Peter Bauer, "Special Edition Using@ Adobe@ Photoshop@ CS and Illustrator@ CS", Chapters 10, pp. 338-385, chapter pp. 1014-1039, Pub. Date: Feb. 13, 2004.*

* cited by examiner

*Primary Examiner* — Mekonen Bekele
(74) *Attorney, Agent, or Firm* — Schwegman Lundberg & Woessner, P.A.

(57) ABSTRACT

In an example embodiment, a system and method is illustrated that includes receiving a layering instruction that includes an image, the image including a layer. Further, the system and method includes generating a sub layer through filtering the layer, the sub layer including a property of the layer. Additionally, the system and method includes editing the property to create an edit, the edit including a change to the property of the layer. Also the system and method includes storing the edit into the sub layer as an edit associated with the sub layer. A system and method is also shown to receive a layered image that includes an image layer stack, the image layer stack including an image with a layer and a sub layer, and an edit associated with the sub layer. The system and method also includes displaying the layered image in a display area.

26 Claims, 23 Drawing Sheets

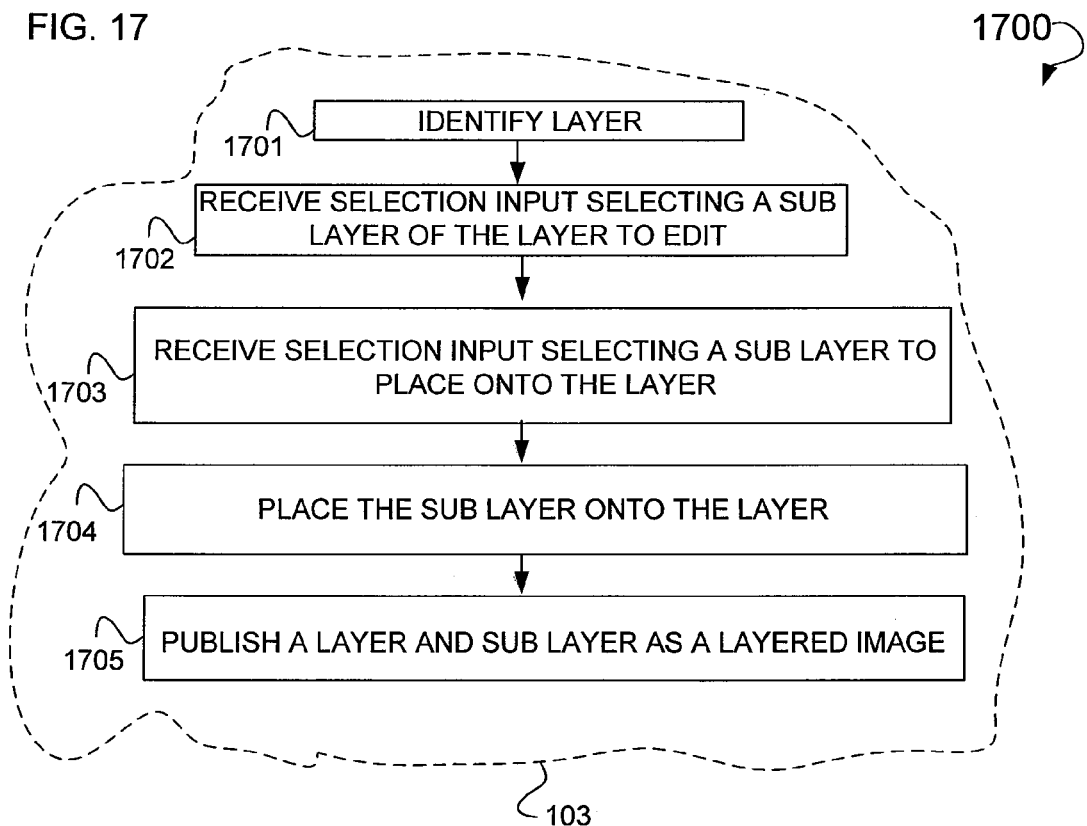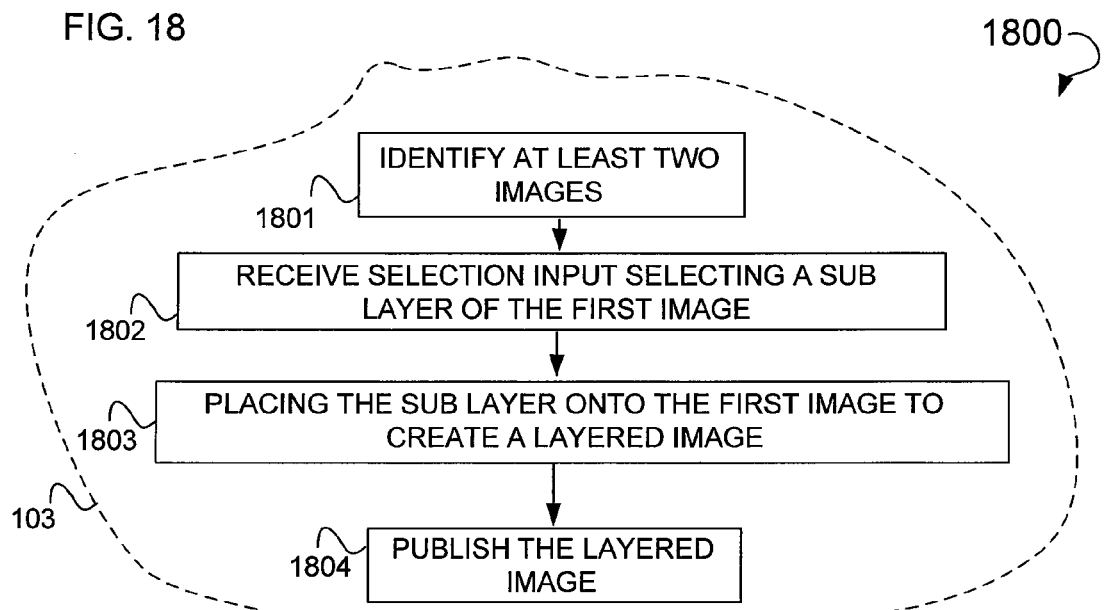

IMAGE LAYER STACK INTERFACE

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

TECHNICAL FIELD

The present application relates generally to the technical field of algorithms and programming and, in one specific example, the manipulation of images.

BACKGROUND

Image editing may allow for the manipulation of a plurality of images by a stand alone application that does not require network connectivity to execute. The color and dimensions of an image may be manipulated using an image editing application. An image editing application may allow for additional textures to be added to an image.

BRIEF DESCRIPTION OF THE DRAWINGS

Some embodiments are illustrated by way of example and not limitation in the figures of the accompanying drawings in which:

FIG. 17 is a flowchart illustrating the execution of a method, according to an example embodiment, used to publish a layer with a sub layer.

FIG. 18 is a flowchart illustrating the execution of method, according to an example embodiment, used to publish a layered image.

DETAILED DESCRIPTION

Figure 1:
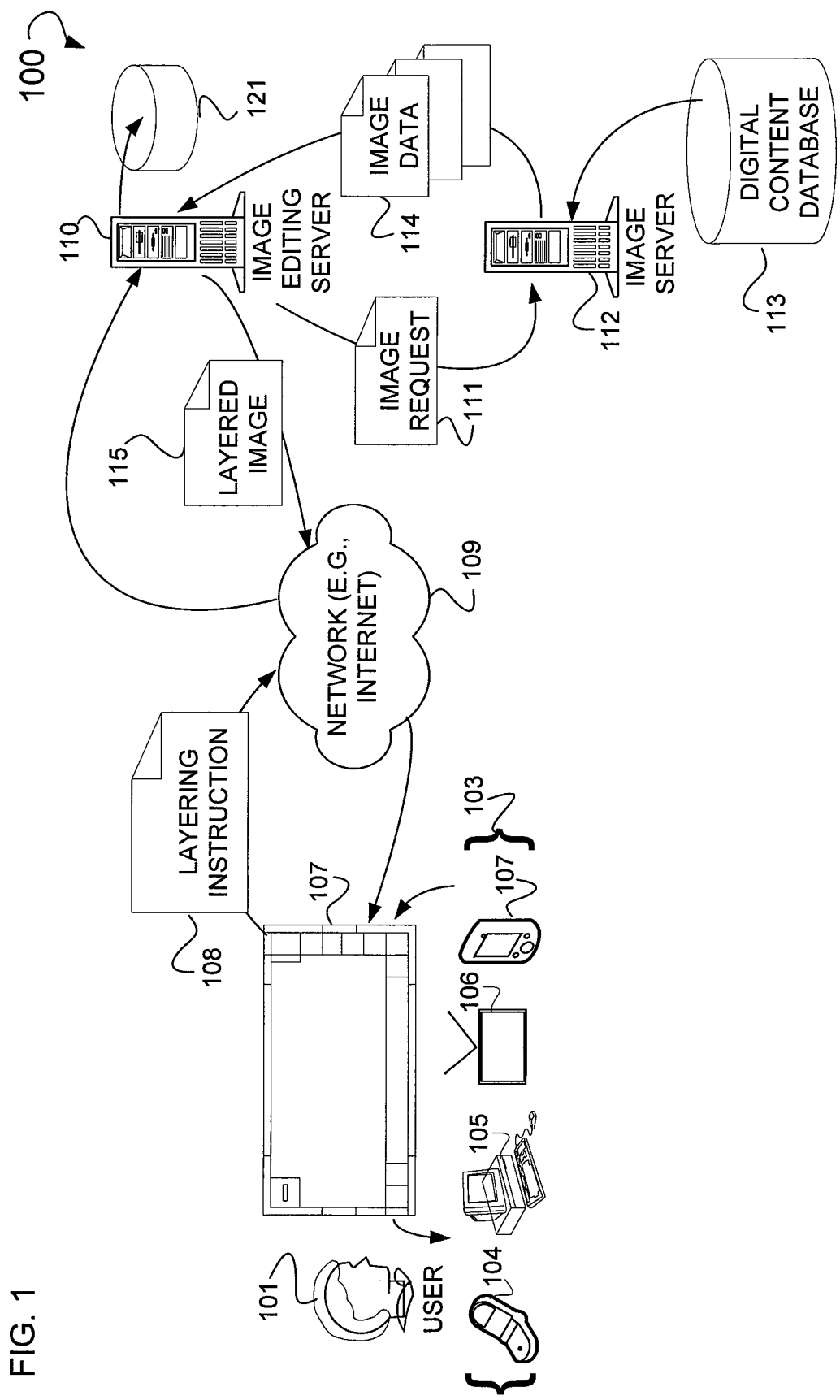
FIG. 1 is a diagram of a system, according to an example embodiment, used to generate the layered image.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is illustrated for generating an image layer stack that includes layers, and sub layers of layers, generated from an image that are organized as a stack. In some example cases, the image layer stack may include layers or sub layers from a plurality of images. An image layer stack may be a stack of displayed images that are layered. The image layer stack includes a layer and at least one additional sub layer or layer. A layer is generated from an image and includes layer data representing pixel values and characteristics associated therewith. A sub layer is generated from a layer and includes pixel values and characteristics associated therewith. Further, the layers and sub layers that make up this image layer stack may have portions of each image in the stack filtered so other portions of other layers and sub layers in the stack may be displayed. Moreover, the layers and sub layers may be toggled between each other such that a particular layer may be brought to the foreground in an image layer stack as displayed. Additionally, edits made to the layer and sub layer may be stored into the image layer stack as an edit history. Edit history may include the change, addition, or removal of properties associated with the layers and sub layers over time. Properties may include pixel values, color codes values, or other suitable values associated with a layer. Images may be digital photos formatted using a Joint Photographic Experts Group (JPEG) format, Graphics Interchange Format (GIF), Tagged Image File Format (TIFF), Portable Network Graphics (PNG), or some other suitable file format.

In some example embodiments, the system and method are shown for generating, manipulating, and displaying an image layer stack using computers organized in a client-server arrangement. A client computer may have a web browser or other suitable Hyper Text Markup Language (HTML), eXtensible Markup Language (XML) interpreter, and associated client engine. The client engine may be FLASH™, Asynchronous JavaScript and XML (AJAX), ACTIVE X™, or Java engine. This client may be referenced herein as a plug-in. Any one of a number of devices may act as a client computer. A server computer, as referenced herein, may be an application server, web server, or some combination of an application server and a web server. An image editing server, or social networking server may be a server computer. An image editing server may be a server that allows for a client computer to manipulate and display an image layer stack and the layers and sub layers included therein. A social networking server may be a server that executes software to build online social networks for communities of people (e.g., natural persons or legal entities such as corporations) who share interests and activities or who are interested in exploring the interests and activities of others.

In some example embodiments, the system and method are shown for generating, manipulating, and displaying an image layer stack that includes the image editing server generating the image layer stack, and filtering portions of the image layer stack (e.g., sub layers). Filter or filtering may include blocking certain pixel values in an image to allow properties such as pixel values from other images in the image layer stack to be displayed.

In some example embodiments, the system and method may include the client computer receiving a layer and a sub layer. The layer may be composed of a plurality of sub layers stacked onto one another. The client computer may receive input denoting a position identification value for the layer and each of the sub layers. The position identification value denotes a layering priority for each sub layer within the image layer stack. The position identification value may be an integer, alpha-numeric string, or some other suitable value giving a priority to one layer or sub layer relative to another layer or sub layer. The client computer may receive input to filter all or a portion of a layer or sub layer. Through filtering, an image of the image layer stack may be able to be displayed in a GUI.

In some example embodiments, the system and method are shown for generating, manipulating, and displaying the image layer stack that includes the posting of the image layer stack on a social networking web page for a particular user. A social network server may provide the functionality to request and to manipulate the image layer stack. This functionality may be accessed by the client computer, such that the social networking server may act as an intermediary (see below figures) between the client computer and the image editing server.

Example System

FIG. 1 is a diagram of an example system 100 used to generate a layered image. Shown is a user 101 who, using any one of a number of devices 103, may generate a layering instruction 108. This layering instruction 108 is generated through the use of a GUI 107 that may, in turn, be generated by any one of a number of devices 103. Devices 103 include a cell phone 104, a computer system 105, a television monitor 106, a Personal Digital Assistant (PDA) 107, or a smart phone (not shown). The layering instruction 108 includes a position identification value for the layer and sub layer, and an image ID of the image to be converted into layer and sub layers. The position identification value may be an integer value denoting the structure of the image stack layer. The image ID may be a type of Globally Unique Identifier (GUID) value denoting the priority of these images in an image layer stack.

This layering instruction 108 is transmitted across a network 109 to be received by an image editing server 110. An image layer stack database 121 is operatively connected to the image editing server 110. This image layer stack database 121 may include layers and sub layers of images reflecting an edit history for the images. This image editing server 110 is operatively connected to an image server 112. Operatively connected includes a logical or physical connection. Further, this logical or physical connection may exist over a Local Area Network (LAN), a Wide Area Network (WAN), the internet or some other suitable network associated topology. The image editing server 110 generates and transmits an image request 111 to be received by the image server 112. The image server 112 is operatively connected to a digital content database 113. This digital content database 113 may natively reside upon the image server 102, or may be controlled by some type of intermediate device such as a database server (not shown). The image server 112 retrieves image data 114, and transmits it to the image editing server 110. The image editing server 110 generates a layered image 115 from the image data 114. The layered image 115 may include a layer and sub layer organized as an image layer stack, wherein the structure of the image layer stack (e.g., which layer or sub layer is at the top of the stack, or has some other position within the stack) is dictated by the position identification value of each layer and sub layer. In some example embodiments, the image layer stack, and layers and sub layers included therein, may include edits made to the layer or sub layer such that the image layer stack reflects an edit history for an image. This layered image 115 is transmitted across the network 109 to be received by the one or more devices 103. The layered image 115 is displayed within the GUI 107 for viewing by the user 101.

Figure 2:
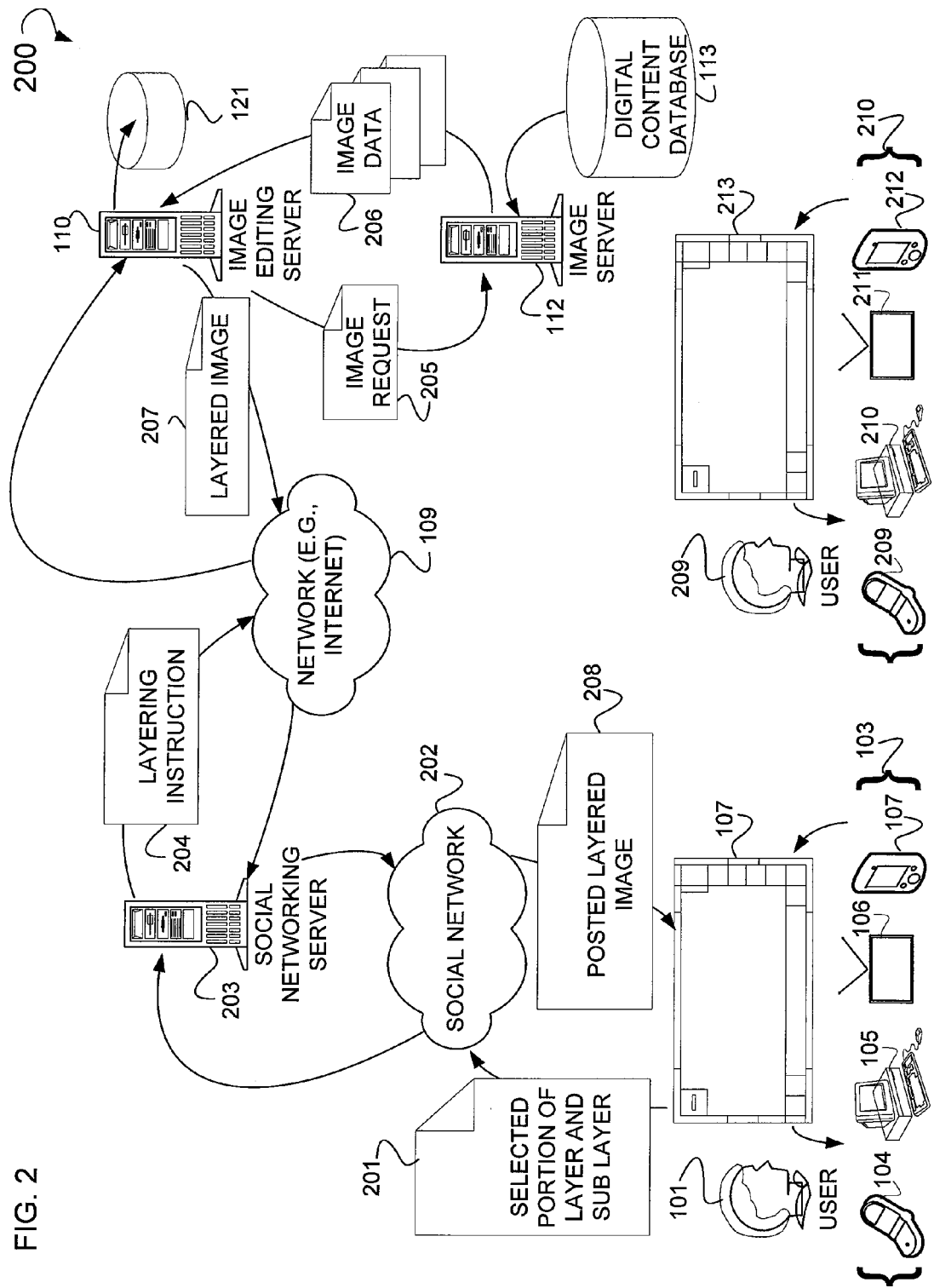
FIG. 2 is a diagram of a system, according to an example embodiment, used to generate a layered image for display on a web page.

FIG. 2 is a diagram of an example system 200 used to generate a layered image for display on a web page. Shown is the user 101 utilizing the GUI 107 in conjunction with the one or more devices 103. This GUI 107 is used to generate a selected layer and sub layer 201. The selected layer and sub layer 201 is transmitted across a social network 202 to be received by a social networking server 203. This social network 202 may be a LAN, a WAN, the internet, or some other suitable network and associated topology. The social networking server 203 transmits layering instructions 204 across the network 109 to be received by the image editing server 110. This image editing server 110 transmits an image request 205 across a LAN, WAN, the internet, or other suitable network associated topology to be received by the image server 112. The image server 112 retrieves one or more images from the digital content database 113, and transmits these images as image data 206 back across a LAN, WAN, or the internet to be received by the image editing server 110. The image editing server 110 transmits a layered image 207 across the network 107 to be received by the social networking server 203. This layered image 207 is converted into a posted layered image 208. This posted layered image 208 is displayed as part of a web page utilized by or otherwise related to the user 101. For example, the posted layered image 208 is displayed on a personal web page served up by the social networking server 203, but edited by the user 101. Also shown is a user 209 who, utilizing any one of a number of devices 210, generates a GUI 213. These devices 210 include a cell phone 209, a computer system 210, a television monitor 211, a PDA 212, or a smart phone (not shown).

Figure 3:
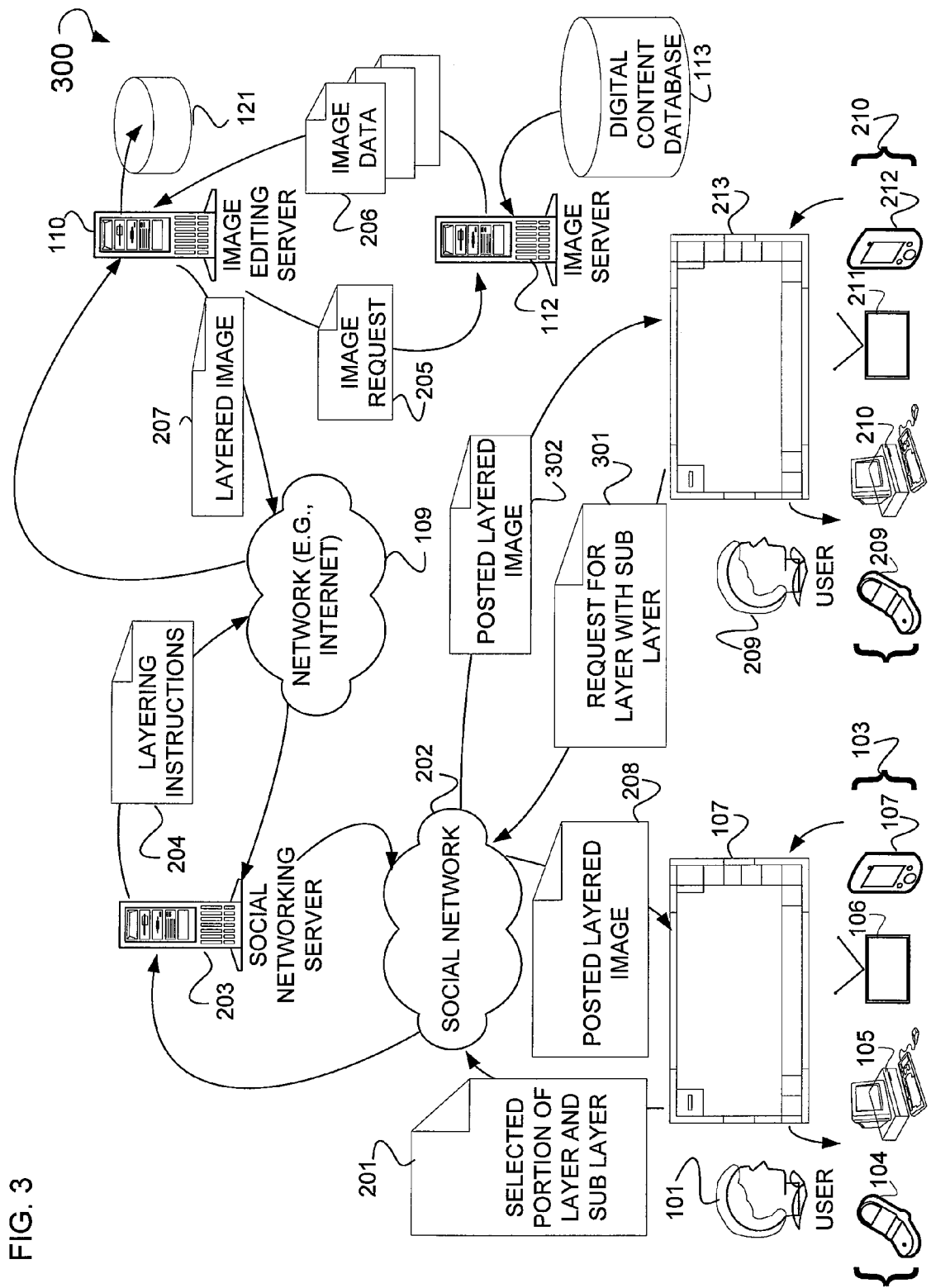
FIG. 3 is a diagram of a system, according to an example embodiment, wherein a user may request a posted layered image.

FIG. 3 is a diagram of an example system 300 wherein a user may request a posted layered image. Shown is the previously illustrated user 209 who, utilizing the any one of a number devices 210, may generate a request for a layer with sub layer 301. This request for the layer with sub layer 301 is transmitted across the social network 202 to be received by the social networking server 203. A posted layered image 302 is transmitted by the social networking server 203 back across a social network 202 for display within the GUI 213. This posted layered image 302 is displayed as part of a web page associated with a particular user of the social networking server 203. This user, for example, includes the user 101 or the user 209.

Example Interfaces

Figure 4:
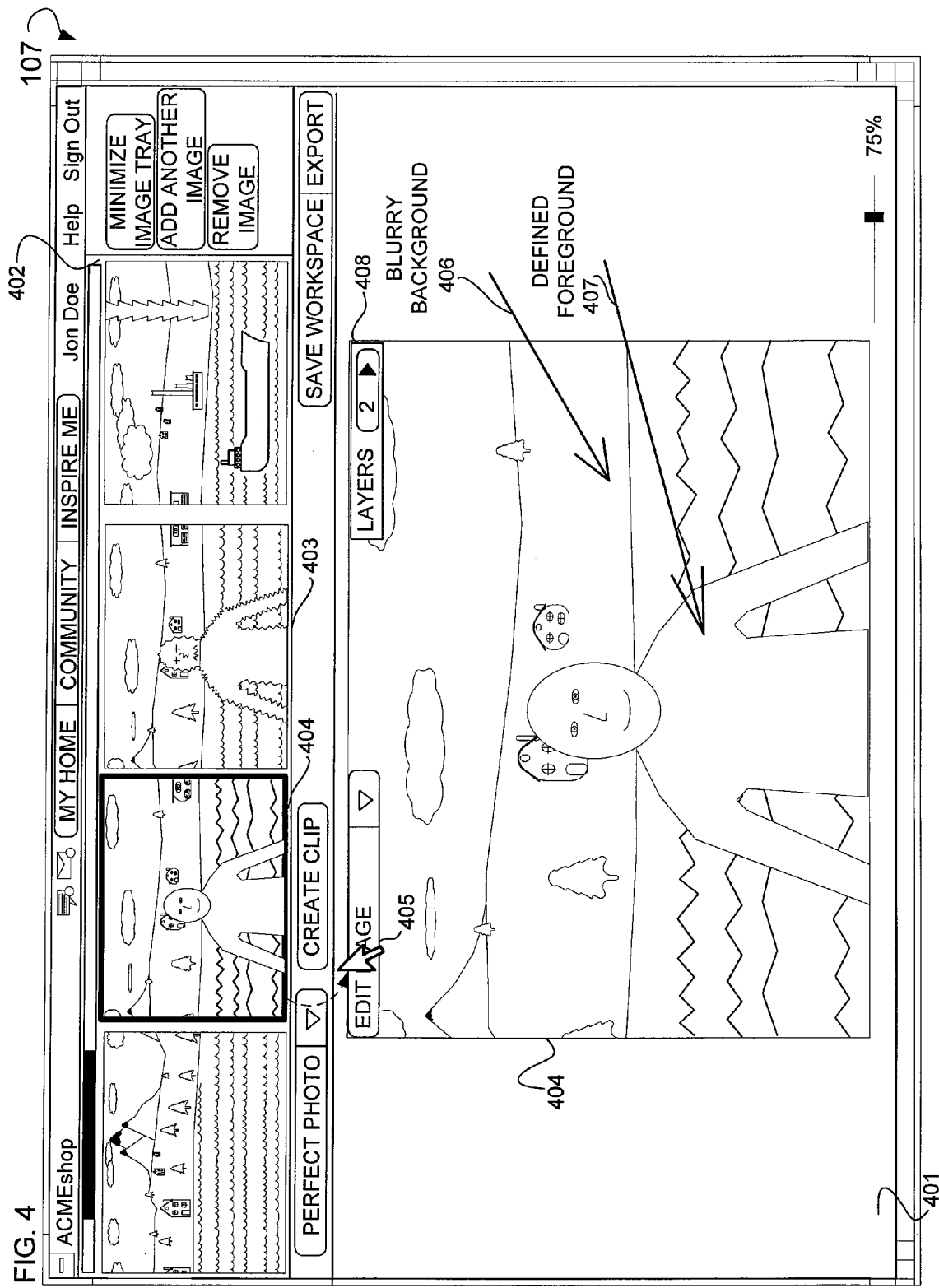
FIG. 4 is a diagram of a Graphical User Interface (GUI), according to an example embodiment, illustrating a selection of the number of layers for an image layer stack.

FIG. 4 is a diagram of an example GUI 107 illustrating a selection of the number of layers for an image layer stack. Shown is an image 403 and an image 404 that are displayed within a sub frame 402. Also shown is a sub frame 401. The sub frame 401 and sub frame 402 are display areas. In some example embodiments, a graphical pointer 405 is used to select the image 404 from the sub frame 402. Using the graphical pointer 405, the image 404 is placed into the sub frame 401. A drag-and-drop function, right-click function or some other suitable function may be used in conjunction with the graphical pointer 405 for placement purposes. This graphical pointer 405 may be focused through the use of some type of input device including a mouse, light pen, touch screen, keyboard, or other suitable input device. Sub frame 401 serves as a work space to manipulate the image that is to be selected as a layer or sub layer. This image 404 has a blurry background 406, and a defined foreground 407. Also shown is a screen object or widget 408 that defines the number of layers or sub layers to be added to the image layer stack associated with image 404. A screen object or widget is an element of the GUI 107 that displays an information arrangement changeable by the user 101. A screen object or widget may include a radio button, check box, or some other suitable screen object or widget. Here, the number "2" is chosen as the number of layers or sub layers to be added to the image layer stack.

Figure 5:
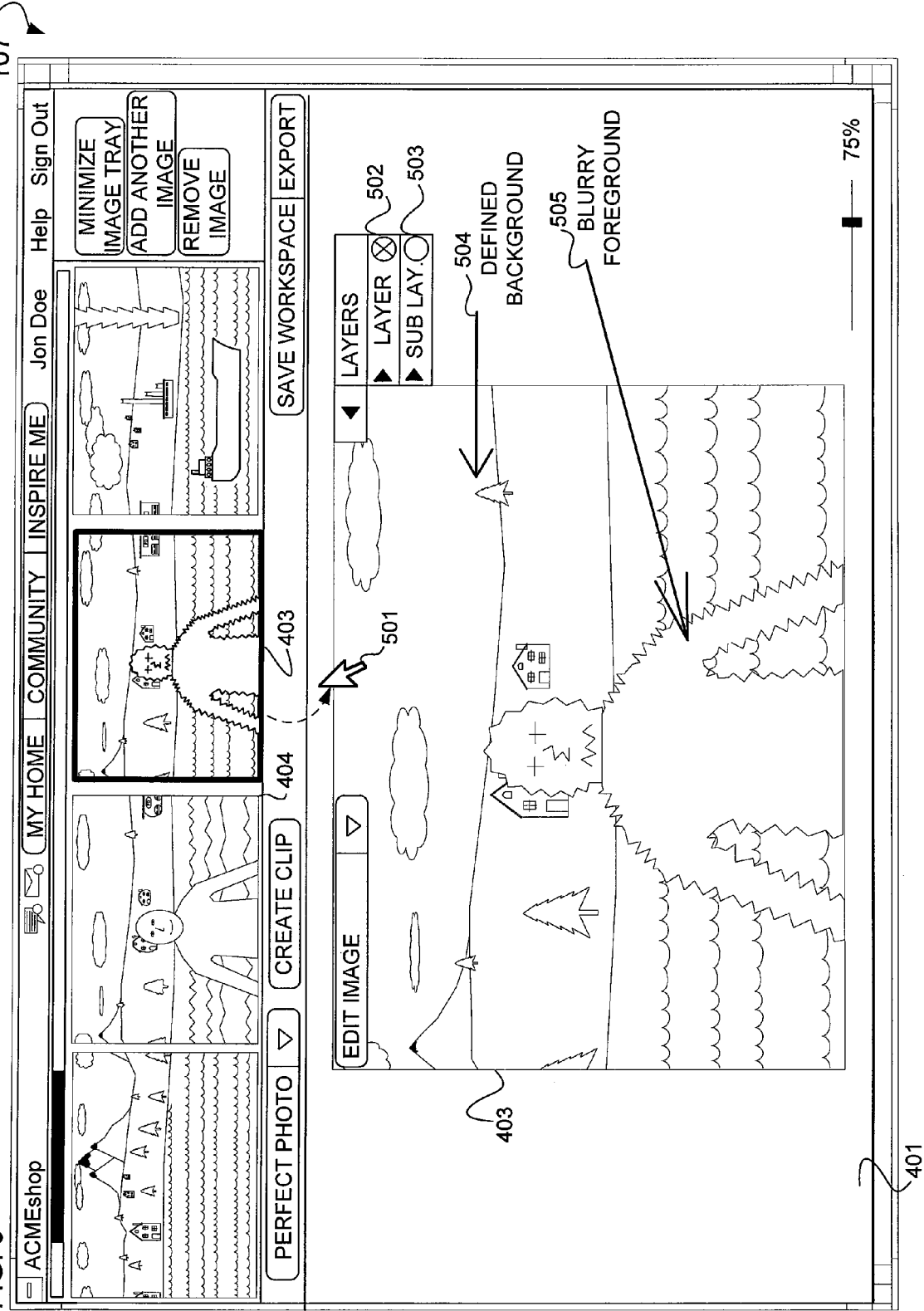
FIG. 5 is a diagram of a GUI, according to an example embodiment, illustrating the selection of a layer from an image for the image layer stack.

FIG. 5 is a diagram of an example GUI 107 illustrating the selection of a layer from an image for the image layer stack. Shown is the image 403 that is selected through the use of a graphical pointer 501. Using the graphical pointer 405, the image 403 is placed into the sub frame 401. A drag-and-drop function, right-click function or some other suitable function may be used. This image 403 has a defined background 504, and a blurry foreground 505. Additionally shown is a screen object or widget 502 and 503 that is used to select whether the image 403 will be a layer or an sub layer. Here, screen object or widget 502 is selected to make the image 403 a layer. Through the execution of the screen object or widget 502, the position identification value for the later is generated and assigned to the layer. The position identification value for the layer is larger than the position identification value for a sub layer generated from the layer. In some example embodiments, the layer and sub layer may be associated using an alpha-numeric sequence such that layer "A" associated sub layers "1A", "2A", "3A" etc.

Figure 6:
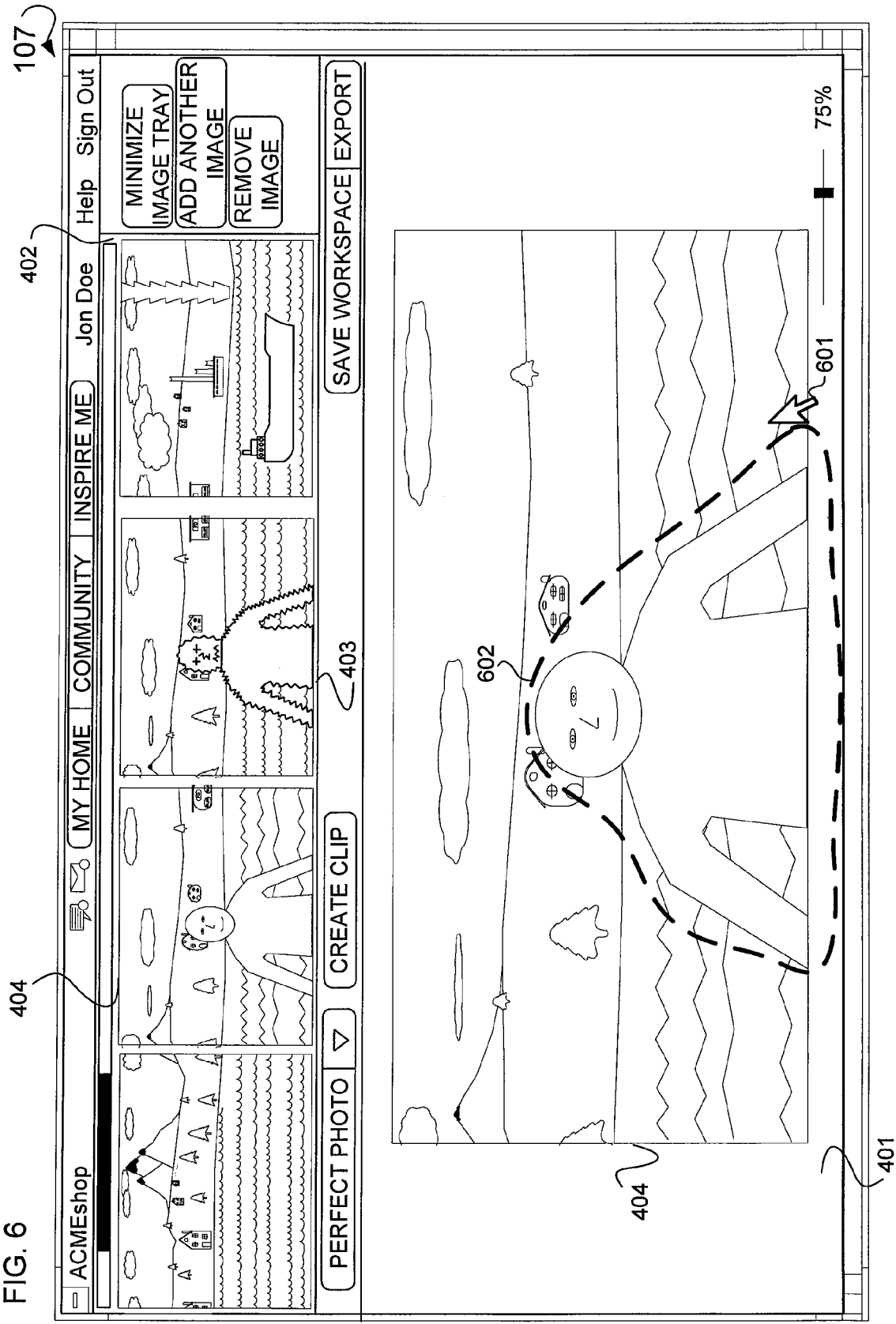
FIG. 6 is a diagram of a GUI, according to an example embodiment, used to generate a sub layer from a layer.

FIG. 6 is a diagram of an example GUI 107 used to generate a sub layer from a layer. The user 101 may utilize an input device to manipulate a graphical pointer 601 in order to select a portion of the image 404 to be a sub layer 602. This sub layer 602 is selected using the graphical pointer 601. The sub layer 602 may be added to an image layer stack. The sub layer 602 may denote a portion of the image 404 is to be filtered or not. The determination as to whether the portion is to be filtered or excluded from filtering may be based upon whether the image is to be a layer, a sub layer, or where the image resides in the image layering stack.

Figure 7:
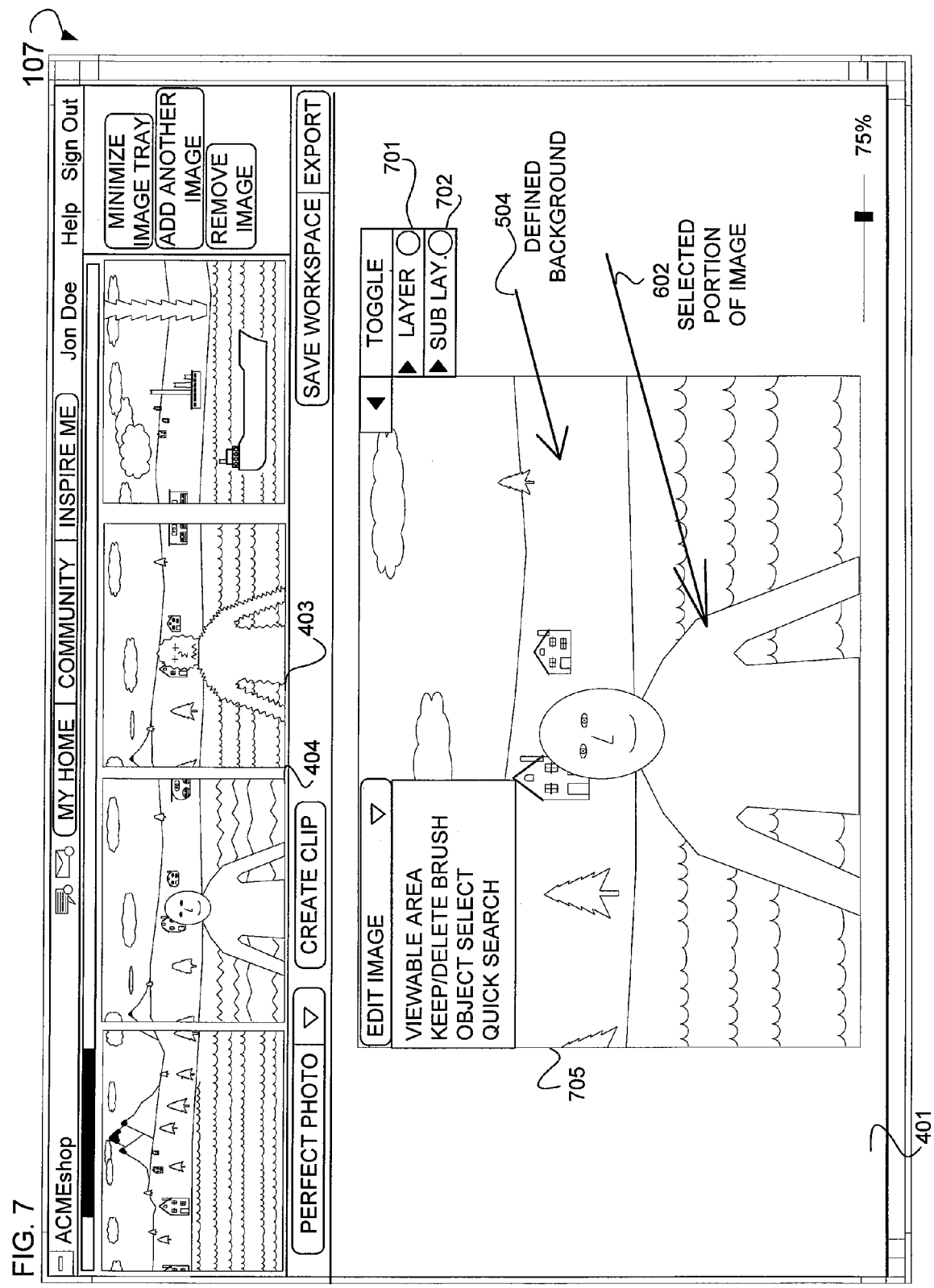
FIG. 7 is a diagram of a GUI, according to an example embodiment, illustrating the combining of a layer and sub layer to generate a layered image.

FIG. 7 is a diagram of an example GUI 107 illustrating the combining of a layer and sub layer to generate a layered image illustrating an image with a defined foreground and background. Displayed is a layered image 705 that is generated from the sub layer 602 and the image 403 selected as a layer (see screen object or widget 502). This combining of sub layer 602 and image 403 may take place within the sub frame 401. Also shown are screen objects or widgets 701 and 702 that may be utilized to toggle between the image 403 and a sub layer 602. Toggle may include switching between two or more layers or images. Specifically, the screen object or widget 701 may be selected using an input device to select a layer image stack for viewing.

Figure 8:
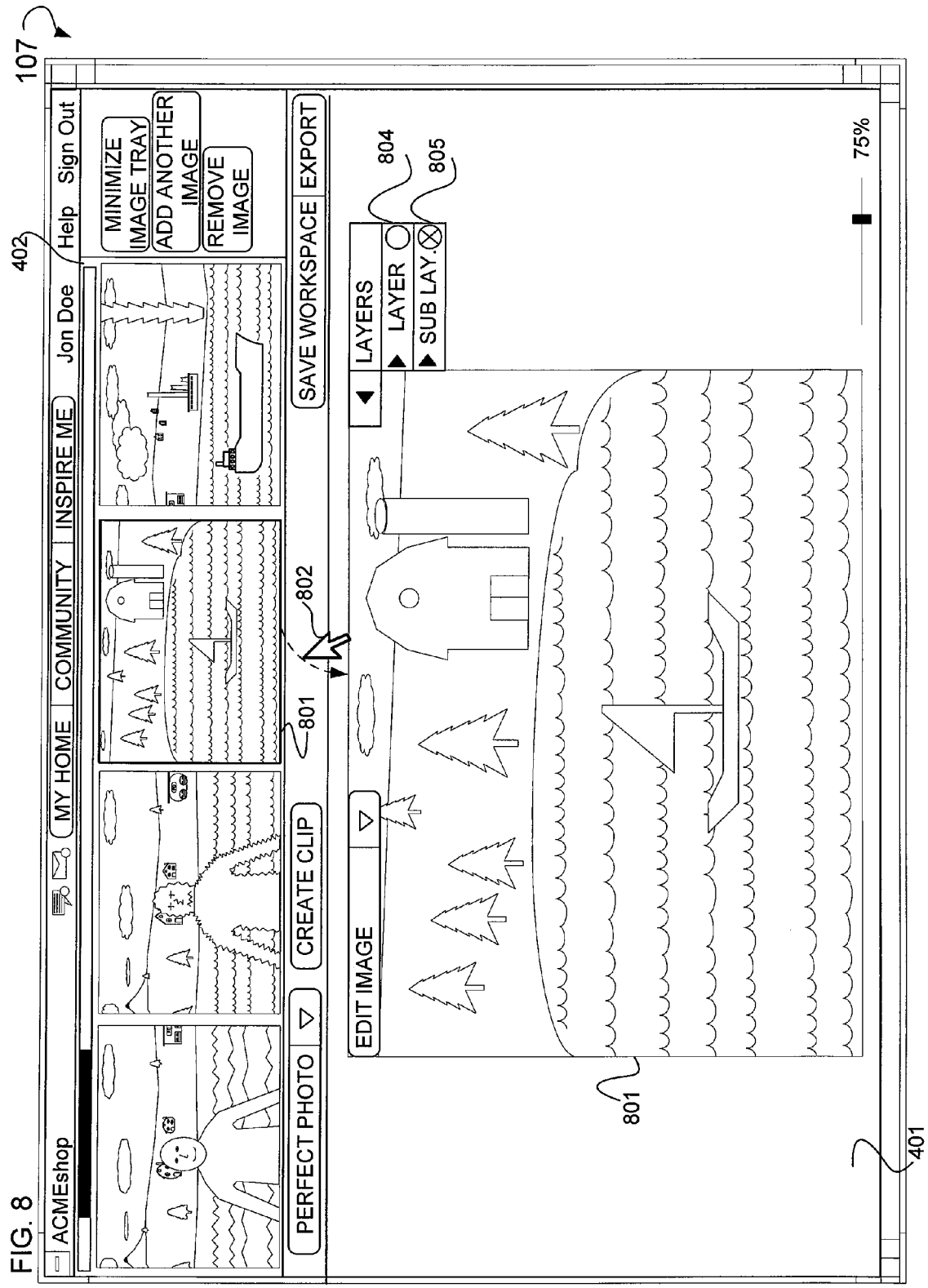
FIG. 8 is a diagram of a GUI, according to an example embodiment, illustrating the selection of an image as a sub layer.

FIG. 8 is diagram of an example GUI 107 illustrating the selection of an image as a sub layer. Shown is an image 801 included within the previously illustrated sub frame 402. This image 801 may be manipulated using a graphical pointer 802 and associated functionality. This associated functionality includes a drop-and-drag function, right click function, or some other suitable function. Further, this graphical pointer 802 may be focused through the use of some type of input device including a mouse, light pen, touch screen, keyboard, or other suitable input device. In some example embodiments, the image 801 is manipulated into the sub frame 401. This image 801 is selected as a sub layer through the use of the screen object or widget 805. Also shown is a screen object or widget 804 to allow for the selection of an image as a layer. Through the execution of the screen objects or widget 805, a position identification value is generated and assigned to the sub layer. This position identification value defines the relative positions for the layer and sub layer within the image layer stack.

Figure 9:
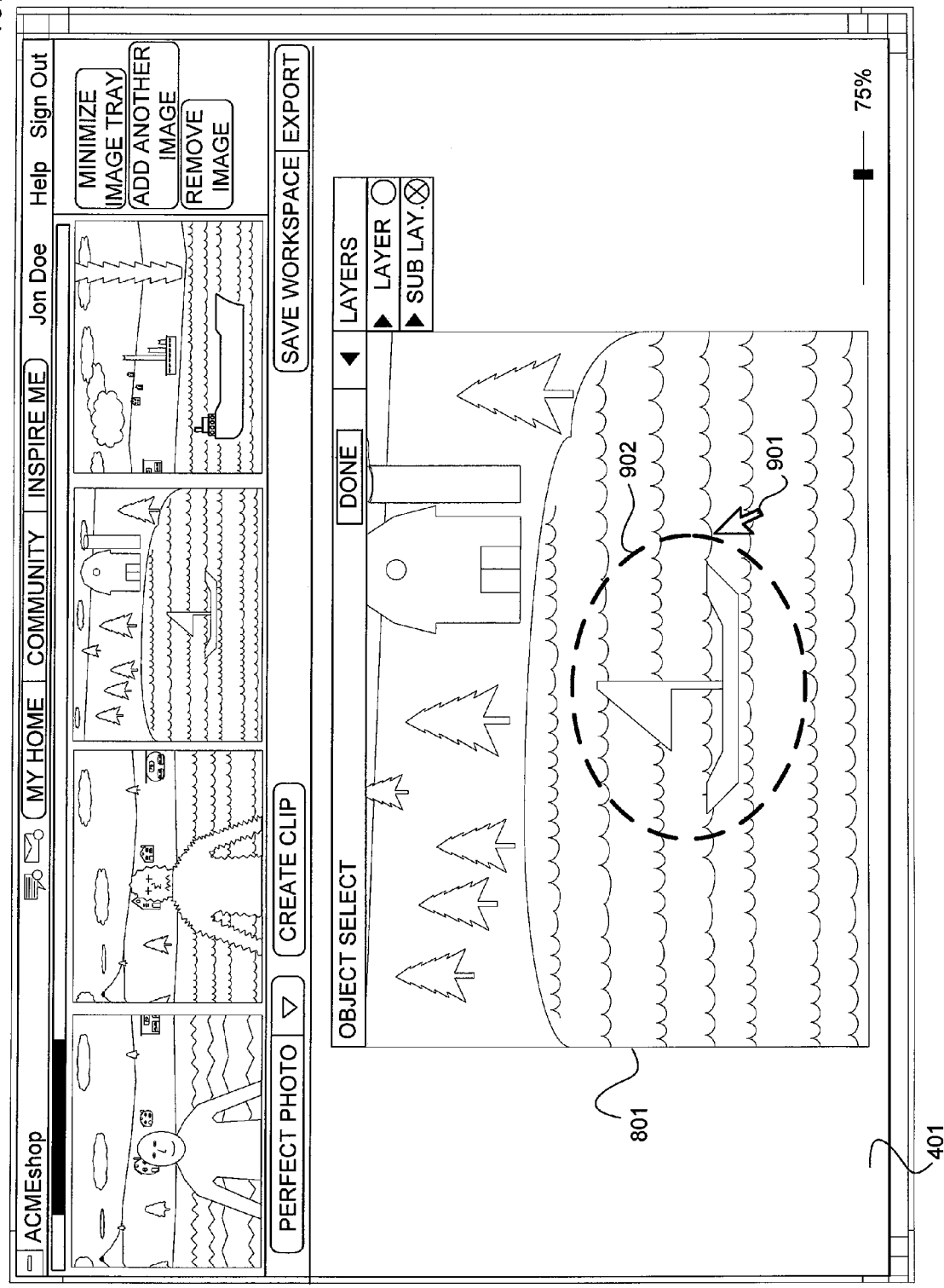
FIG. 9 is a diagram of a GUI, according to an example embodiment, illustrating the selection of a portion of an image to be a sub layer.

FIG. 9 is a diagram of an example GUI 107 illustrating the selecting of a portion of an image to be a sub layer. Shown is the image 801 that is manipulated within the sub frame 401. In some example embodiments, a graphical pointer 901 is utilized and manipulated by an input device such that a portion of the image 901 is selected, as reflected at 902, to be a sub layer. Here, at 902, a sailboat and associated background, are selected through the use of a graphical pointer 901.

Figure 10:
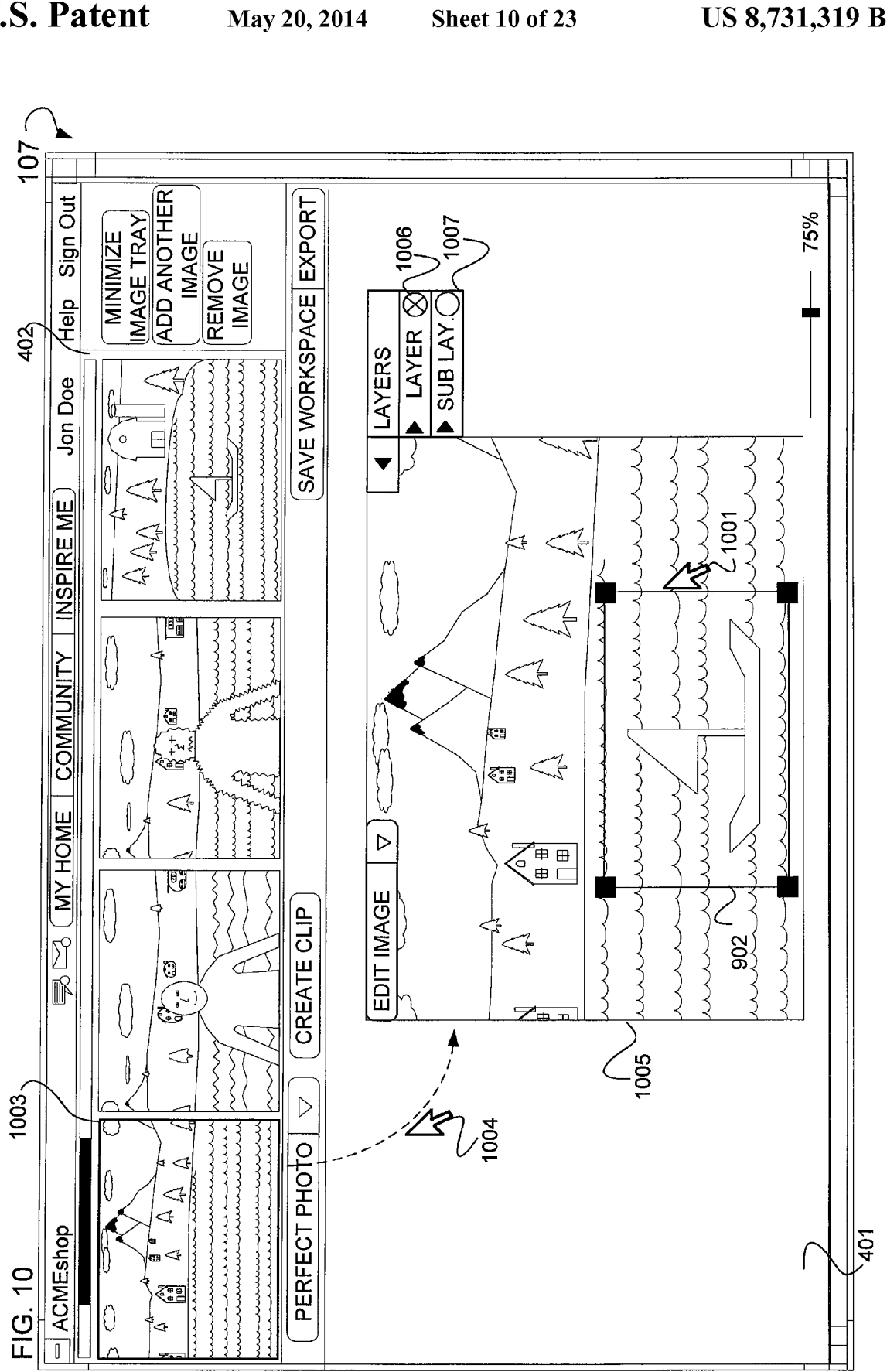
FIG. 10 is a diagram of a GUI, according to an example embodiment, illustrating the layering of a portion of an image (e.g., a sub layer) onto a layer.

FIG. 10 is a diagram of an example GUI 107 illustrating the layering of a sub layer onto a layer. Here, an image 1003 is selected from the sub frame 402 and manipulated using a graphical pointer 1004 to be placed into the sub frame 401. This image 1003 is selected as a layer 1005 via the screen object or widget 1006. Further, a graphical pointer 1001 is utilized to combine the sub layer 902 and with the layer 1005 to create an image layer stack (see FIG. 25 below). Further, a screen object or widget 1006 or 1007 is used to select whether the layer 1005 should be at the top of the image layer stack.

Through the use of the screen object or widget 1006, a position identification value is assigned to the layer 1005.

Figure 11:
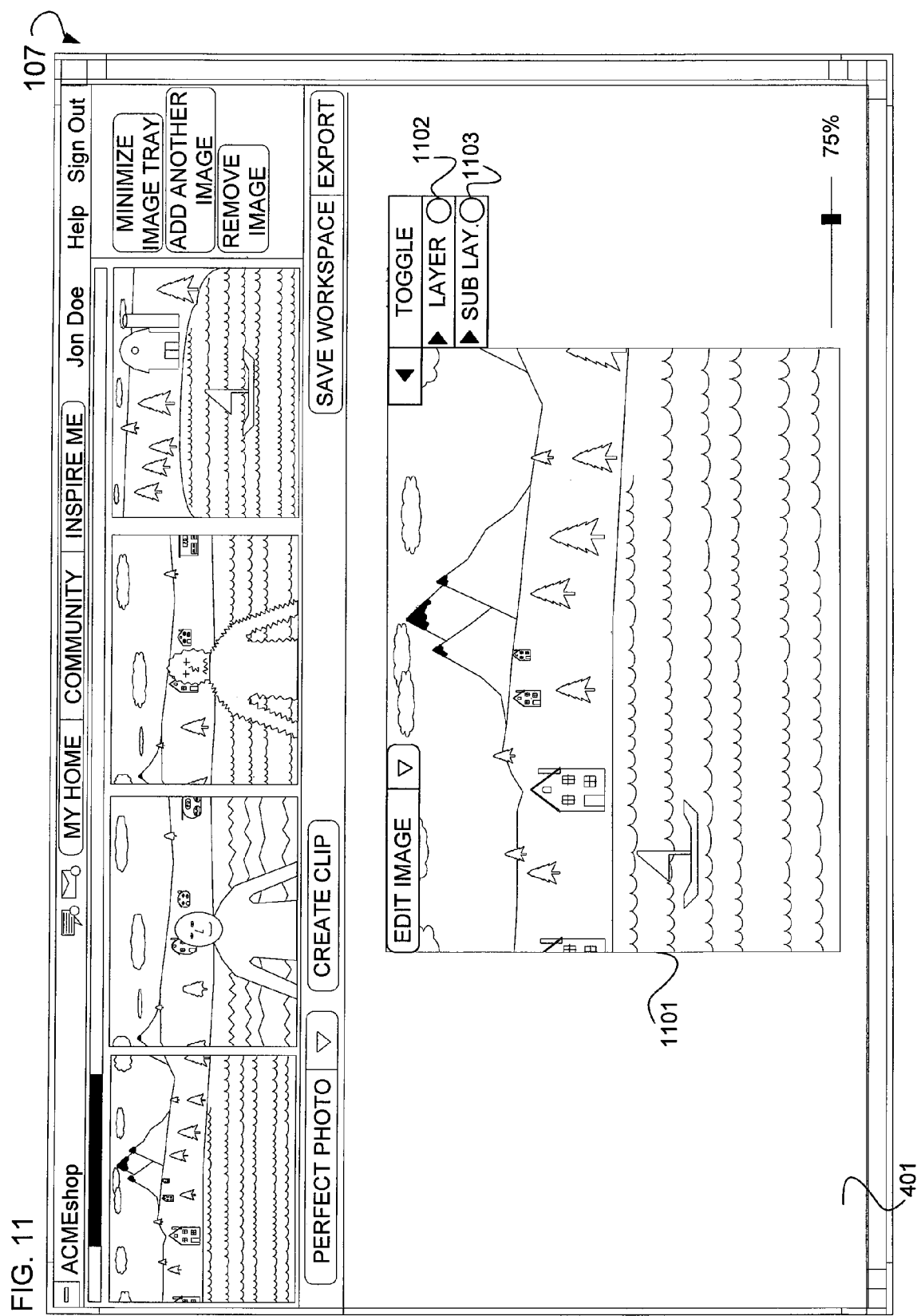
FIG. 11 is a diagram of a GUI, according to an example embodiment, illustrating the ability to toggle between different layers of an image.

FIG. 11 is a diagram of an example GUI 107 illustrating the ability to toggle between different layers of an image. Shown is an image 1101. This image 1101 includes a layer and a sub layer. Using the screen object or widget 1102 and 1103, a user is able to toggle or switch between layers and sub layers of the image layer stack.

Figure 12:
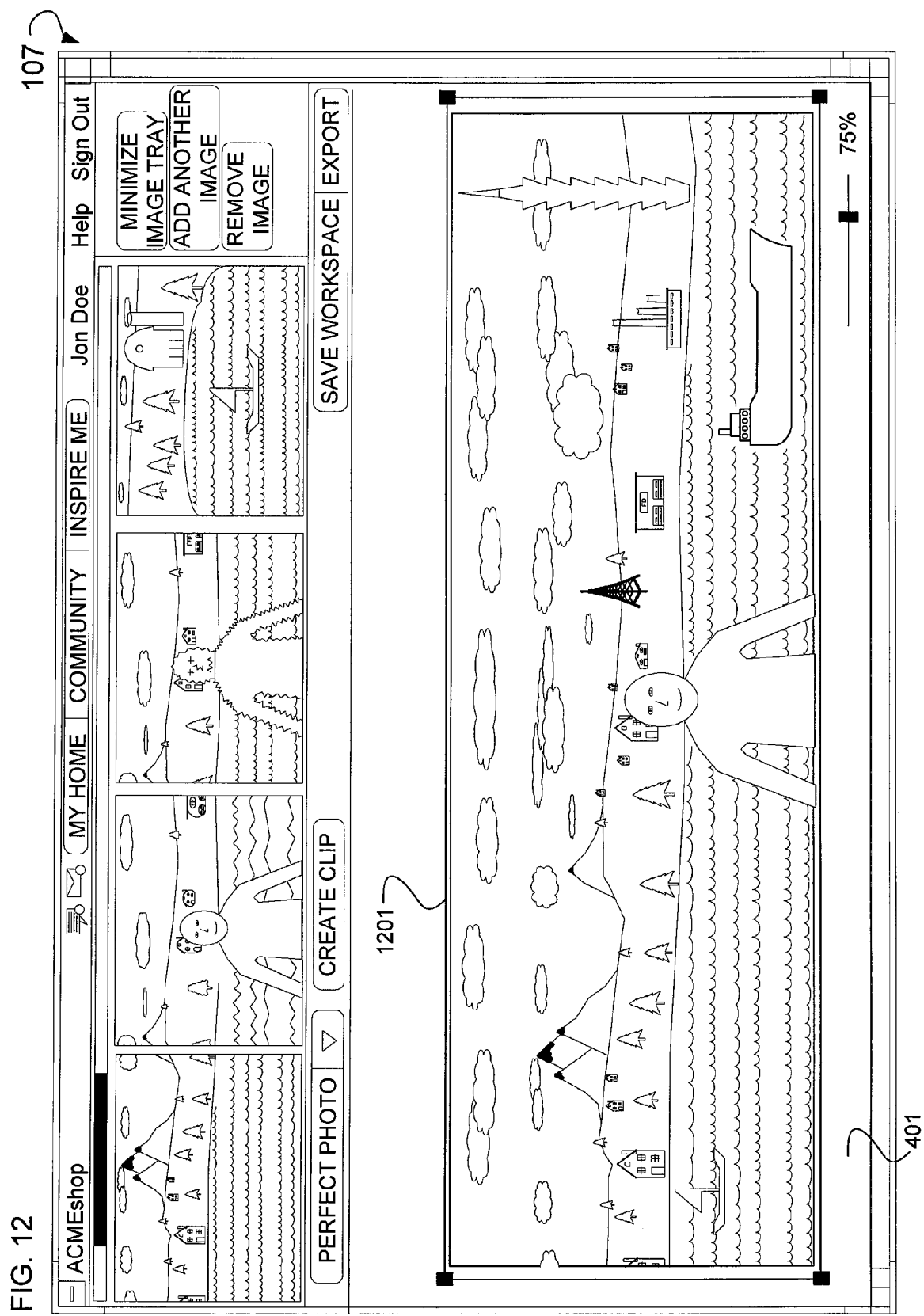
FIG. 12 is an illustration of a GUI, according to an example embodiment, showing a layered image displayed within a sub frame.

FIG. 12 is an illustration of an example GUI 1007 showing a layered image 1201 displayed within the sub frame 401. This layered image 1201 includes sub layer 902 and sub layer 602. These layer and sub layers may be combined together into a single image layer stack.

Example Logic

Figure 13:
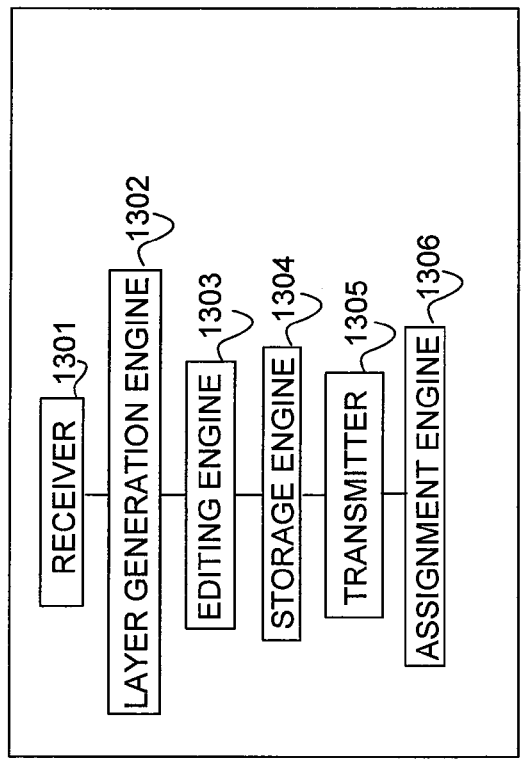
FIG. 13 is a block diagram of a computer system, according to an example embodiment, used to create a layered image.

FIG. 13 is a block diagram of an example computer system 1300 used to create a layered image. The blocks illustrated herein may be implemented in hardware, firmware, or software. These blocks may be implemented by the image editing server 110. Further, these blocks are communicatively coupled via a direct or indirect logical or physical connection. Illustrated is the computer system 1300 including a receiver 1301 to receive a layering instruction that includes an image, the image including a layer. Communicatively couple to the receiver 1301 is a layer generation engine 1302 to generate a sub layer through a filter of the layer, the sub layer to include a property of the layer. Communicatively coupled to the layer generation engine 1302 is an editing engine 1303 to edit the property to create an edit, the edit to include a change to the property of the layer. A storage engine 1304 is communicatively coupled to the editing engine 1303 to store the edit into the sub layer as an edit associated with the sub layer. Communicatively coupled to the editing engine 1303 is a transmitter 1305 to transmit a layered image that includes an image layer stack that includes the layer and the sub layer. In some example embodiments, the image layer stack reflects an edit history for the image in the form of the layer and the sub layer. In some example embodiments, the layer generating engine 1302 generates an additional sub layer from the sub layer. Further, in some example embodiments, the sub layer includes an additional sub layer. Moreover, the property includes at least one of a pixel value, or a color code value. Communicatively coupled to the transmitter 1305 is an assignment engine 1306 to assign a first position identification value to the layer, and a second position identification value to the sub layer.

Figure 14:
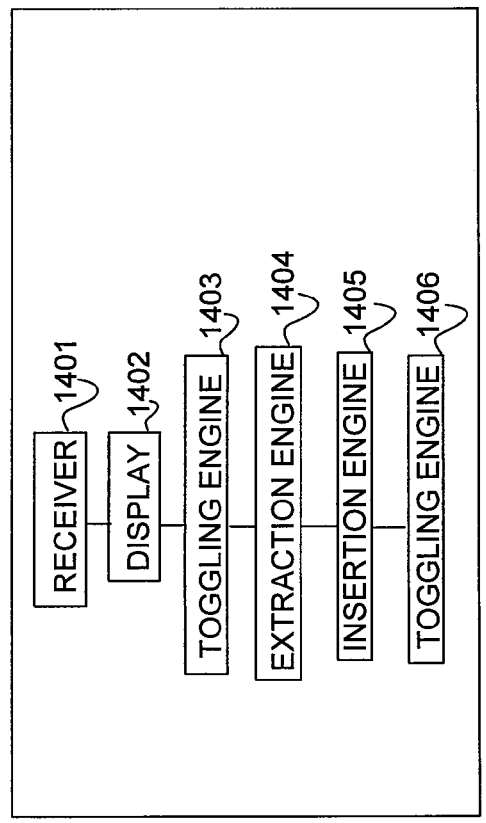
FIG. 14 is a block diagram of a computer system, according to an example embodiment, used to display a layered image.

FIG. 14 is a block diagram of an example computer system 1400 used to display a layered image. The blocks illustrated herein may be implemented in hardware, firmware, or software. These blocks may be implemented by the one or more devices 103, or social networking server 203. Further, these blocks are communicatively coupled via a direct or indirect logical or physical connection. Illustrated is the computer system 1400 including a receiver 1401 to receive a layered image that includes an image layer stack, the image layer stack including an image with a layer and a sub layer, and an edit associated with the sub layer. Communicatively coupled to the receiver 1401 is a display 1402 to display the layered image in a display area. A toggling engine 1403 may be communicatively coupled to the display 1402 to toggle between the layer and the sub layer of the image layer stack. Communicatively coupled to the receiver 1401 is an extraction engine 1404 to extract the sub layer from the image layer stack. Communicatively coupled to the receiver 1401 is an insertion engine 1405 to insert the sub layer into an image layer stack. Communicatively coupled to the display 1402 is a toggling engine 1406 to toggle between the layer and sub layer of the image layer stack to identify an edit history for the layered image. In some example embodiments, toggling engine 1403 and 1406 may be the same toggling engine.

Figure 15:
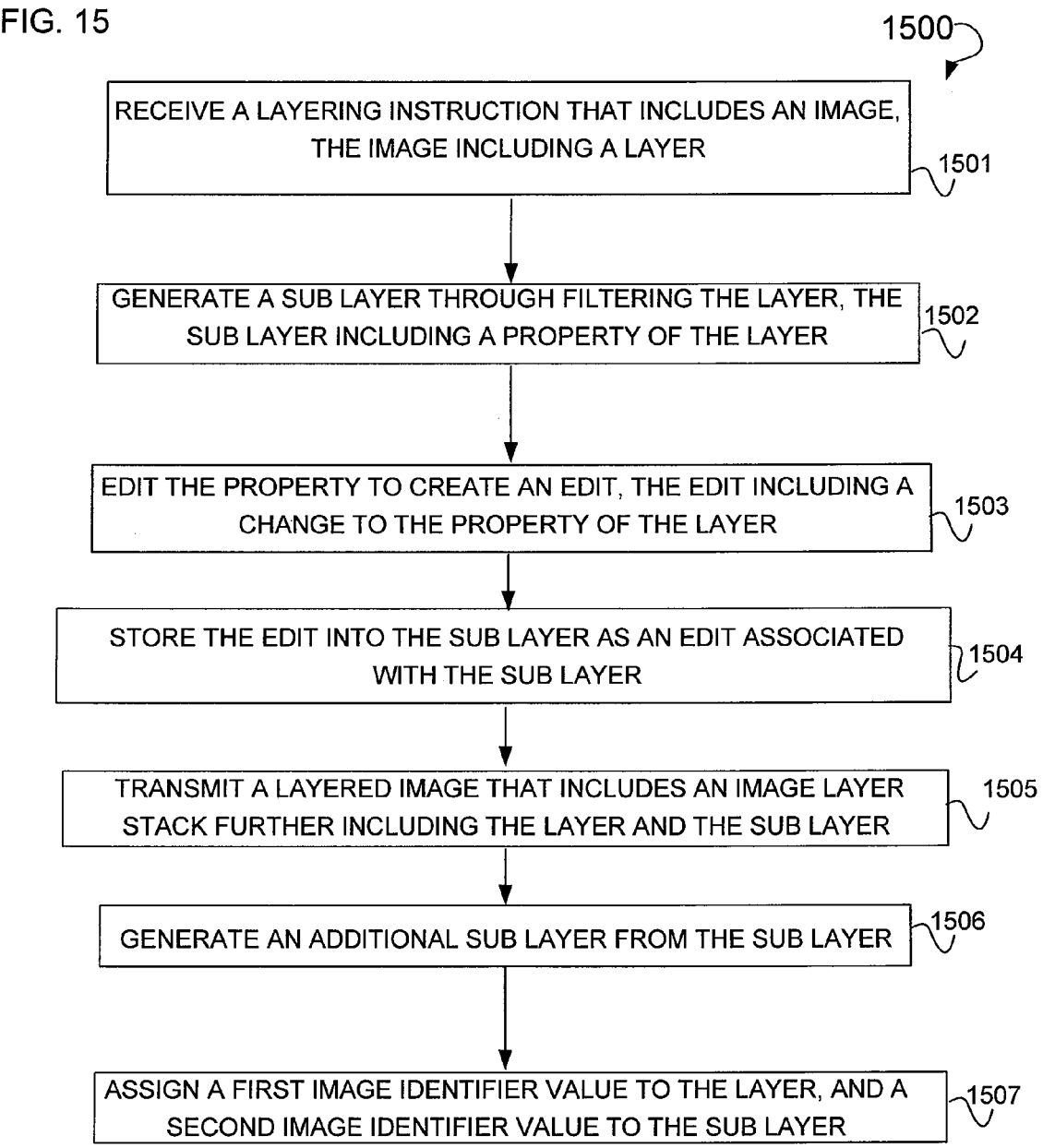
FIG. 15 is a flow chart illustrating a method, according to an example embodiment, used to receive a layering instruction to be used to generate a layered image.

FIG. 15 is a flow chart illustrating an example method 1500 to receive a layering instruction to be used to generate a layered image. This method may be implemented by the image editing server 110. Illustrated is an operation 1501 that, when executed, receives a layering instruction that includes an image, the image including a layer. An operation 1502 is executed to generate a sub layer through filtering the layer, the sub layer including a property of the layer. Operation 1503 is executed to edit the property to create an edit, the edit including a change to the property of the layer. Operation 1504 is executed to store the edit into the sub layer as an edit associated with the sub layer. Operation 1505 is executed to transmit a layered image that includes an image layer stack further including the layer and the sub layer. In some example embodiments, the image layer stack reflects an edit history for the image in the form of the layer and the sub layer. Operation 1506 is executed to generate an additional sub layer from the sub layer. Some example embodiments may include, the sub layer including an additional sub layer. In some example embodiments, the property includes at least one of a pixel value, or a color code value. Operation 1507 is executed to assign a first position identification value to the layer, and a second position identification value to the sub layer.

Figure 16:
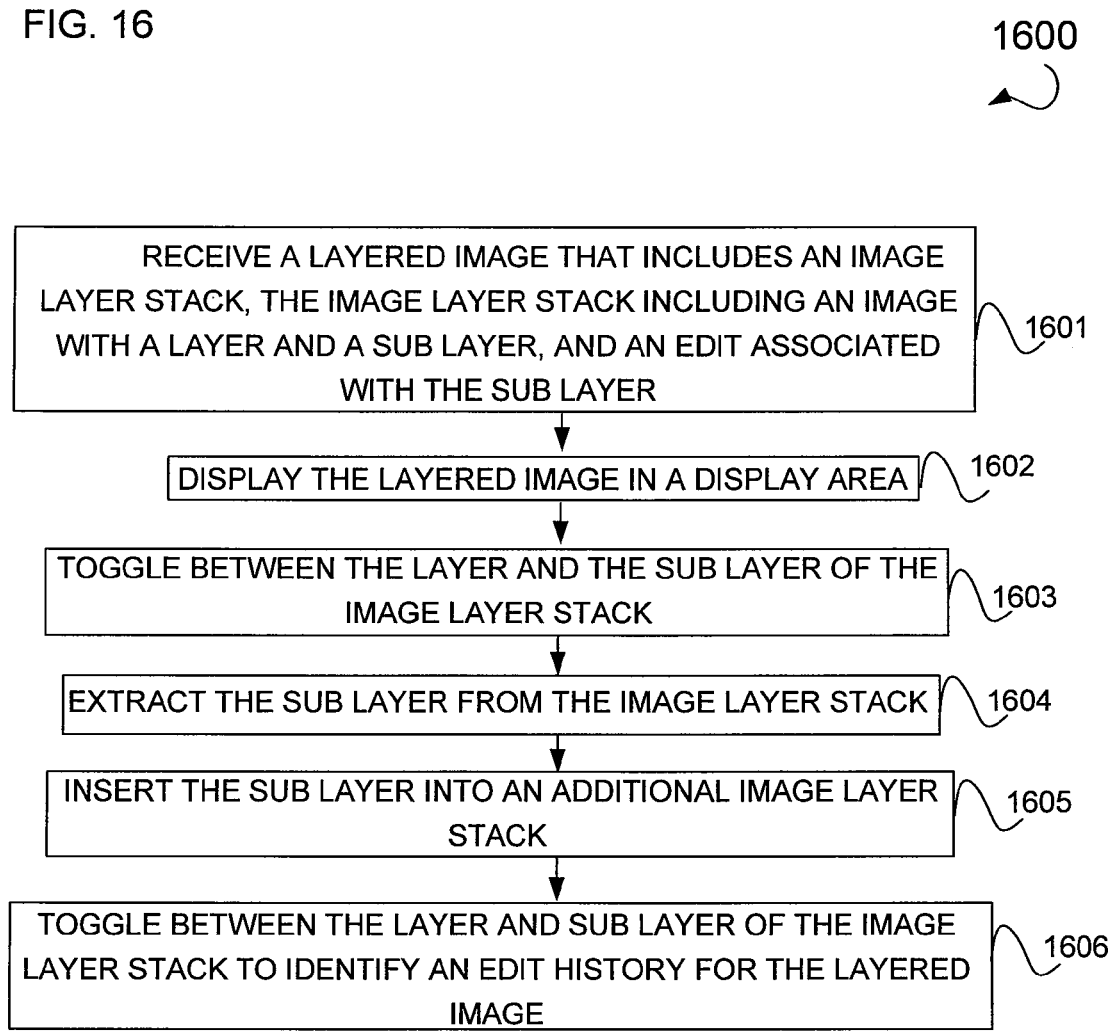
FIG. 16 is a flow chart illustrating a method, according to an example embodiment, used to display a layered image.

FIG. 16 is a flow chart illustrating an example method 1600 to display a layered image. This method 1600 may be implemented by the one or more devices 103, or social networking server 203. An operation 1601 is shown that, when executed, receives a layered image that includes an image layer stack, the image layer stack including an image with a layer and a sub layer, and an edit associated with the sub layer. Operation 1602 is executed to display the layered image in a display area. Operation 1603 is executed to toggle between the layer and the sub layer of the image layer stack. Operation 1604 is executed to extract the sub layer from the image layer stack. Operation 1605 is executed to insert the sub layer into an image layer stack. Operation 1606 is executed to toggle between the layer and sub layer of the image layer stack to identify an edit history for the layered image.

FIG. 17 is a flowchart illustrating the execution of example method 1700 used to publish a layer with a sub layer. Shown are various operations 1701 through 1705 that may reside upon, or otherwise be executed by, the one or more devices 103. A plug-in may execute these operations 1701 through 1705. An operation 1701 is executed to identify a layer, this identification including the utilization of a graphical pointer and associated functionality as executed through the use of some type of input device. An operation 1702 is also shown that, when executed, receives selection input selecting a sub layer of the layer to edit. An operation 1703 is shown that, when executed, receives a selection input selecting a sub layer to place onto the layer. Further, an operation 1704 is executed that places the sub layer onto the layer. Additionally, an operation 1705 is executed that publishes a layer and sub layer as a layered image (see e.g., FIG. 7, FIG. 11 and FIG. 12).

FIG. 18 is a flowchart illustrating the execution of example method 1800 used to publish a layered image. Shown are various operations 1801 through 1804 that may reside or otherwise be executed by the one or more devices 103. A plug-in may execute these operations 1801 through 1804. An operation 1801 is shown that, when executed, identifies at least two images. An operation 1802 is executed to receive selection inputs selecting a sub layer of the first image. An operation 1803 is executed that places the sub layer onto the first image to create a layered image. An operation 1804 is executed that publishes the layered image. This publication may take the form of publishing the layered image on some type of social networking web page, or other suitable web page generated and/or served up by the social networking server 203.

Figure 19:
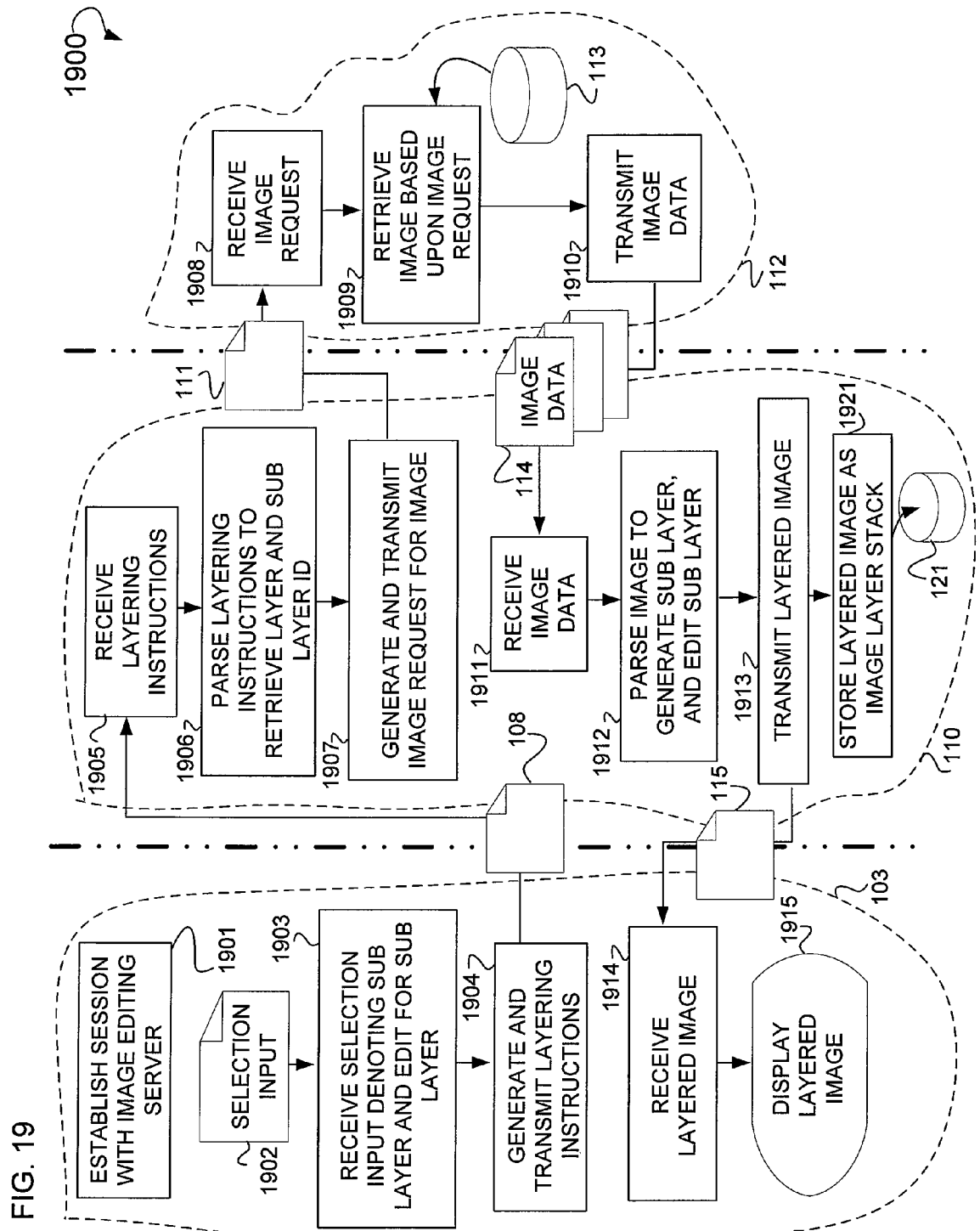
FIG. 19 is a tri-stream flowchart illustrating the execution of operation, according to an example embodiment, used to generate a layered image.

FIG. 19 is a tri-stream flowchart illustrating the execution of example operation 1900 used to generate a layered image. Shown is an operation 1901, 1903, 1904, 1914, and 1915 that may reside upon, or otherwise be executed by, one or more devices 103. Further, operation 1901, 1903, 1904, 1914 and 1915 may be executed by a plug-in. Also shown are operations 1905 through 1907, and 1911 through 1913 that may reside upon, or be otherwise executed by, the image editing server 110. Further, shown are operations 1908 through 1910 that may reside upon, or otherwise be executed by, the image server 112. With respect to operation 1901, when executed, operation 1901 establishes a session with the image editing server 110. This session includes a Transmission Control Protocol/Internet Protocol (TCP/IP) session, a login session, or some other suitable session allowing the one or more devices 103 to communicate with the image editing server 110. Selection input 1902 is received through the execution of operation 1903. This selection input 1902 includes a selection of a layer and sub layer from an image. The selection input 1902 may include an image ID, position identification values associated with the layer and/or sub layer, and edits for the layer and/or sub layer. An operation 1904 is executed that generates and transmits layering instructions as layering instruction 108 to be received through the execution of operation 1905. An operation 1906 is executed that parses the layering instructions to retrieve the image ID. An operation 1907 is executed that uses the image ID to generate and transmit the image request 111 for an image(s) from which the layer and sub layer may be generated. The image request 111 includes the image ID. This image request 111 is received through the execution of operation 1908. An operation 1909 is executed that retrieves an image(s) based upon the image request 111 from the digital content database 113. This retrieval process, as executed by the operation 1909, includes the use of a Structured Query Language (SQL) and associated commands utilizing the image ID associated with the image.

An operation 1910 is executed that transmits the image data 114. An operation 1911 is executed that receives image data in the form of image data 114. An operation 1912 is executed that parses the image data 114 to generate sub layers, and edits these sub layers. These layer and sub layers may be organized in an image layer stack according to the position identification values included within the layering instructions 108. An operation 1913 is executed that transmits a layered image in the form of layered image 115 to be received through the execution of operation 1914. In some example embodiments, operation 1914 facilitates toggling. Operation 1921 is executed to store the layered image 115 into the image layer stack database 121 as an edit history. An operation 1915, when executed, displays a layered image. This display of the layered image may take place in the GUI 107, the GUI 213, or, more generally, as a part of a web page served up by the social networking server 203.

Figure 20:
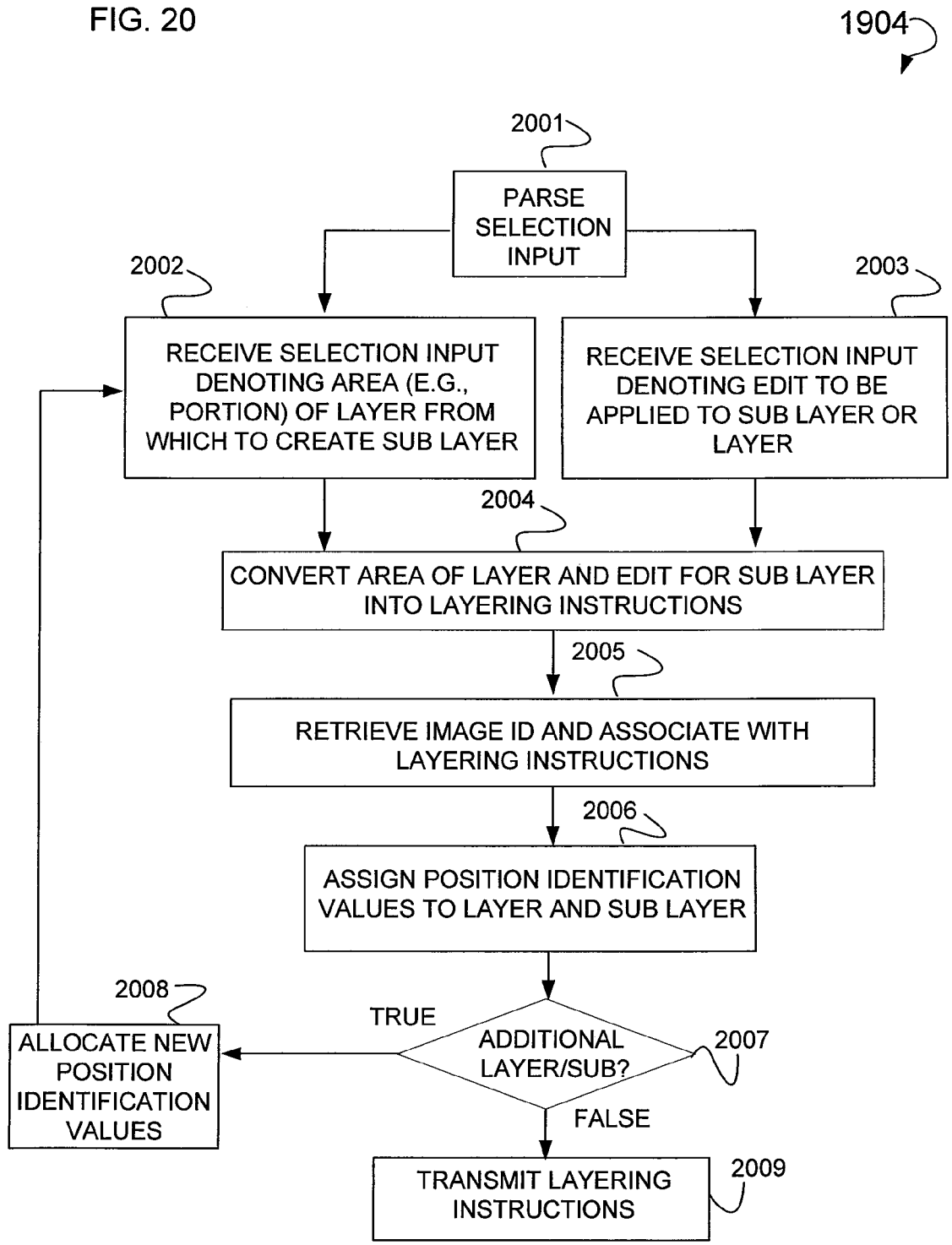
FIG. 20 is a flowchart illustrating the execution of operation, according to an example embodiment, that generates and transmit layering instructions.

FIG. 20 is a flowchart illustrating the execution of example operation 1904. Shown is an operation 2001 that, when executed, parses the selection input 1902. An operation 2002 is executed that receives selection input denoting an area of the layer from which to generate a sub layer, the area defined in terms of pixels. Further, an operation 2003 is executed that receives selection input denoting an edit to be applied to the sub layer or layer. The edit may include adding, removing, or changing the characteristics of (e.g., color, orientation, size) the pixel values in the area selected as the sub layer. An operation 2004 is executed that converts the area of the layer and sub layer into layering instructions. An operation 2005 is executed that retrieves an image ID and associates the image ID with layering instructions. An operation 2006 is executed that assigns position identification values to a layer and sub layer. A decisional operation 2007 is executed that determines if additional layers or sub layers exist in addition to the previous layer and sub layer. In cases where decisional operation 2007 evaluates to "true," an operation 2008 is executed that allocates new position ID values in light of the previously allocated position ID values. In cases where decisional operation 2007 evaluates to "false," an operation 2009 is executed that transmits layering instructions in the form of layering instruction 108.

Figure 21:
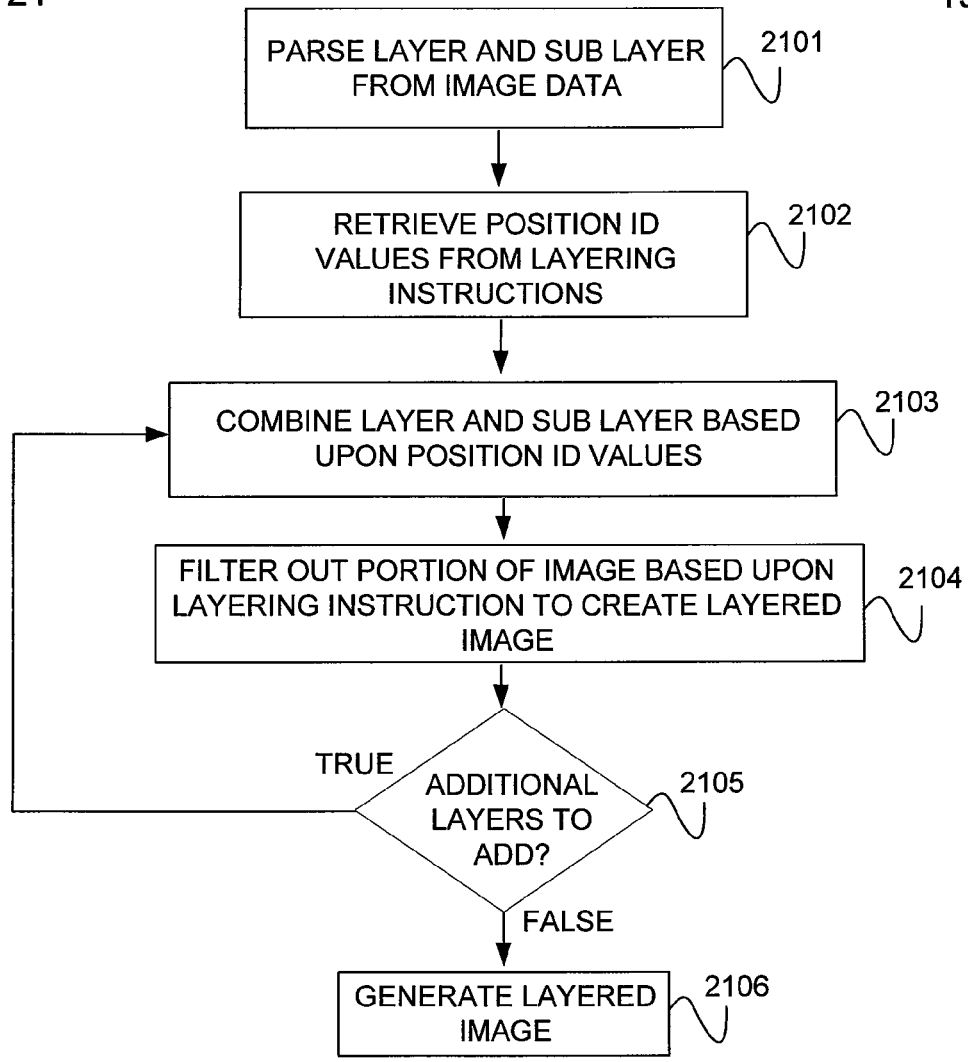
FIG. 21 is a flowchart illustrating the execution of an operation, according to an example embodiment, to generate a layered image.

FIG. 21 is a flowchart illustrating the execution of example operation 1912. Shown is an operation 2101 that, when executed, parses the layer and sub layer from image data. An operation 2102 is executed that retrieves position ID values from the layering instruction 108. An operation 2103 is executed that combines a layer and sub layer based upon the position ID values. An operation 2104 is executed that filters out a portion of an layer based upon the layering instructions to create a layered image. This operation 2104 may be optional. A decisional operation 2105 is executed that determines whether there are sub layers to add to the image layer stack. In examples where decisional operation 2105 evaluates to "true," the previously illustrated operation 2103 is re-executed. In example cases where decisional operation 2105 evaluates to "false," an operation 2106 is executed that generates the layered image 115 that includes the image layer stack.

Figure 22:
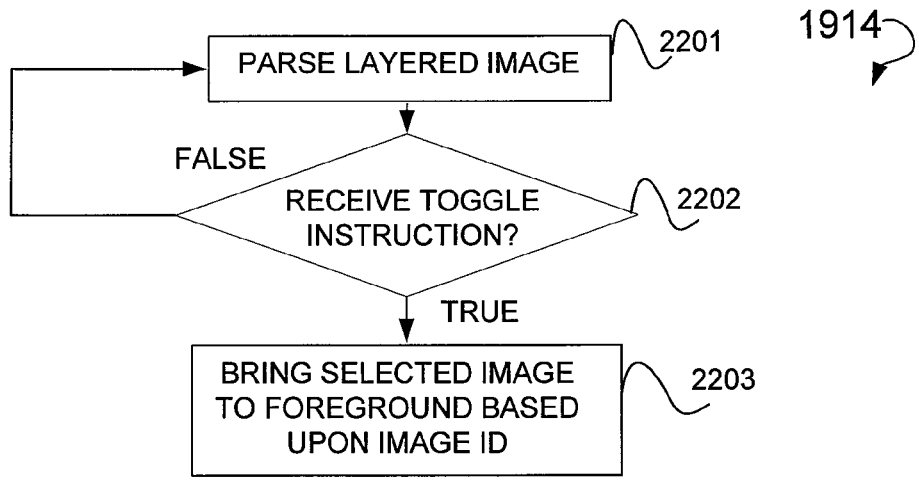
FIG. 22 is a flowchart illustrating the execution of an operation, according to an example embodiment, that facilitates toggling between images.

FIG. 22 is a flowchart illustrating the execution of example operation 1914. Shown is an operation 2201 that, when executed, parses a layered image. Further, a decisional operation 2202 is executed that determines whether or not a toggle instruction has been received. A toggle instruction is reflected in the usage of, for example, the screen objects or widgets 701 and 702 to move between two or more layers or sub layers that make up an image as displayed. In examples where decisional operation 2202 evaluates to "false," the previously shown operation 2201 is re-executed. In cases where decisional operation 2202 evaluates to "true," an operation 2203 is executed that brings a selected image to the foreground based upon the position identification value.

Figure 23:
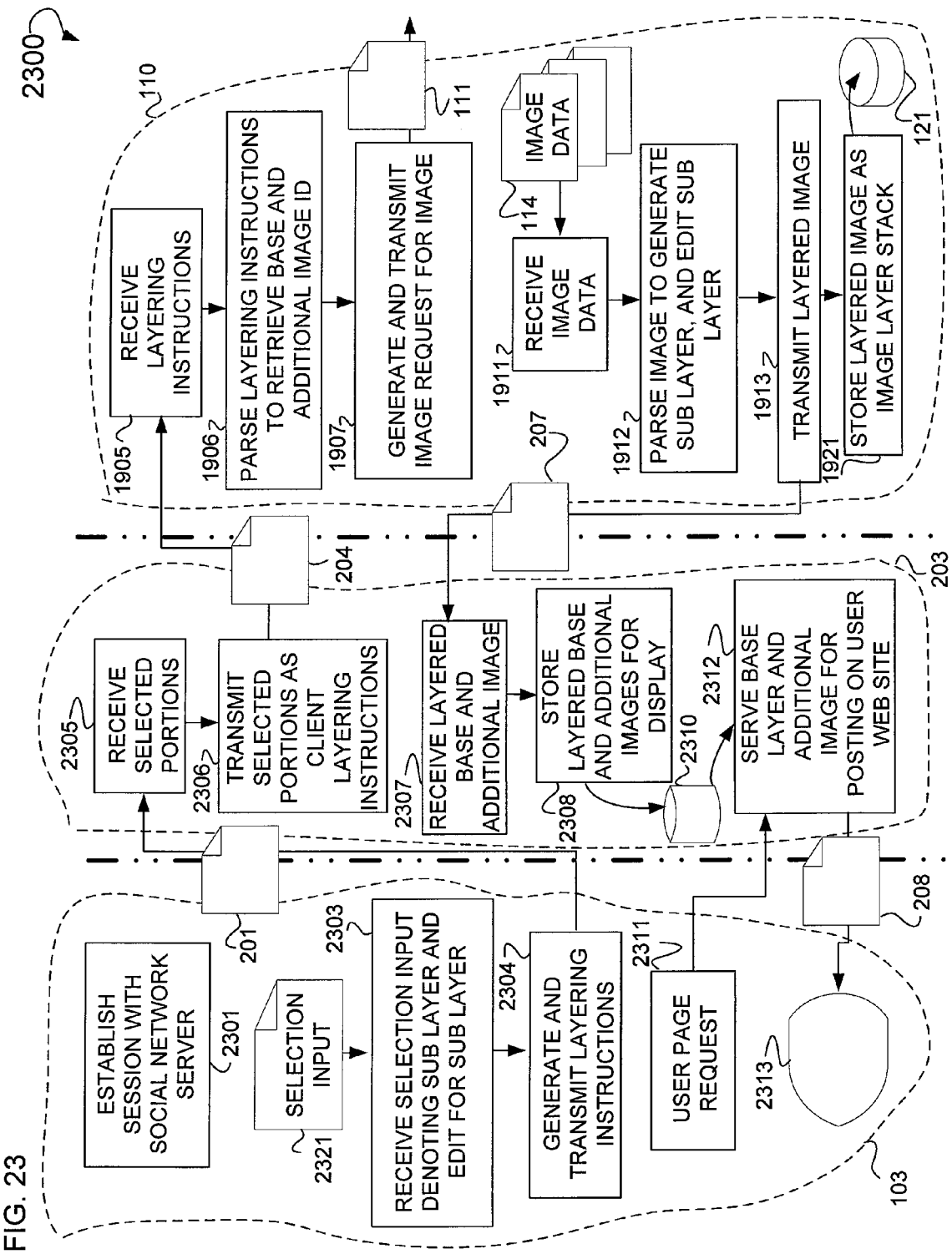
FIG. 23 is a tri-stream flow chart illustrating the execution of method, according to an example embodiment, used to generate a layer with sub layer for display within a social networking web page.

FIG. 23 is a tri-stream flow chart illustrating the execution of example method 2300 used to generate a layer with a sub layer for display within a social networking web page. Shown is an operation 2301, 2303, 2304, 2311 and 2313 that may reside upon or otherwise be executed by the one or more devices 103. These operations may be executed by a plug-in. Also shown are operations 2305 through 2308, and 2314 that may reside upon or otherwise be executed by the social networking server 203. Also shown are the previously illustrated operations 1905 through 1907 and 1911 through 1913, and 1921.

In some example embodiments, an operation 2301 is executed that establishes a session with the social networking server. This session may be in the form of a TCP/IP session, a login session, or some other suitable session. This session is established between the one or more devices 103 and the social networking server 203. A selection input 2321 is generated through the use of some type of input device and is received through the execution of operation 2303. The selection input 2321 may include the data described for the selection input 1902 plus a network handle for the social networking user such as user 101. A network handle may include an alpha-numeric identifier for the user 101 by which the user 101 is referenced by the social networking server 203 and associated social network 202. An operation 2304 is executed that generates and transmits selected layer and a sub layer 201. The selected layer and sub layer 201 is received through the execution of operation 2305. An operation 2306 is executed that transmits the layer and sub layer 201 as a client layering instruction 204 to be received through the execution of operation 1905. An operation 2307 is executed that receives the layered image 207 that includes the layered layer and sub layers. An operation 2308 is executed that stores a layered and sub layer for display within a database 2310. An operation 2312 is executed that serves the layer and sub layer as an image for posting on a website. This operation 2312 is executed, in part, through the execution of operation 2311 that generates and transmits a user page request. The layer, with the posted layered image 208, is displayed within a display 2313 that exists within, or is a part of the GUI 107 or GUI 213.

Figure 24:
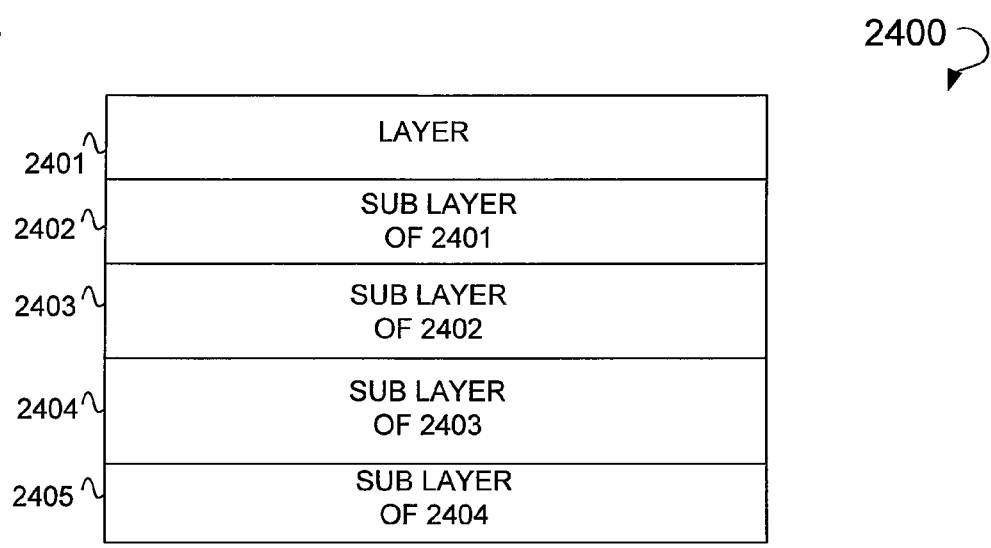
FIG. 24 is a diagram of an image layer stack, according to an example embodiment, illustrating a layer and a plurality of sub layers from the same image.

FIG. 24 is a diagram of an example image layer stack 2400 illustrating a layer and a plurality of sub layers from the same image. Shown is a layer 2401 that is associated with an image. In some example embodiments, a portion of the layer 2401 is generated in the form of sub layer 2402. A sub layer 2403 may be generated from the sub layer 2404. A sub layer 2404 may be generated from the sub layer 2403. A sub layer 2404 may be generated from the sub layer 2405. In some example embodiments, the image layer stack 2400 may be stored into the image layer stack database 121. Further, in some example embodiments, a sub layer is generated is generate from another layer or sub layer when an edit is made. This sub layer is saved within the image later stack as part of an edit history. As illustrated elsewhere, the image layer stack 2400 may be organized through the use of position identifier values assigned to each of the layers and sub layers that make up the image layer stack.

Figure 25:
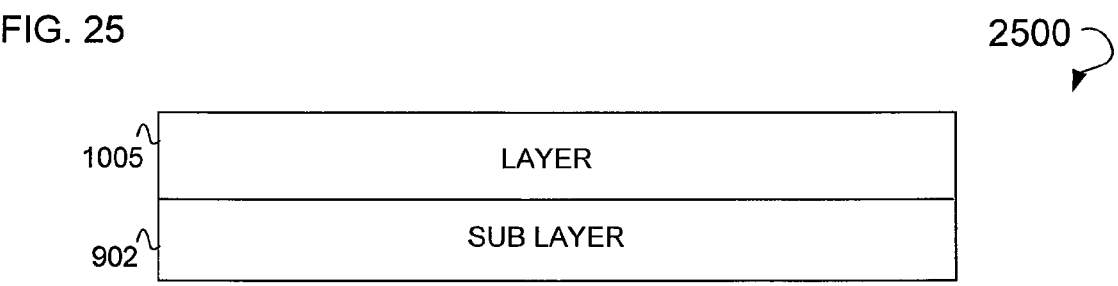
FIG. 25 is a diagram of an image layer stack, according to an example embodiment, illustrating a layer and a sub layer from different images.

FIG. 25 is a diagram of an example image layer stack 2500 illustrating a layer 1005 and a sub layer 902 from different images. Shown is the layer 1005 that is associated with the image 1003. Additionally, a sub layer 902 is shown that is the sub layer associated with the image 801. In contrast to the image layer stack 2400, this image layer stack 2500 is generated from an image 1005 and sub image 902 that are from different images. As illustrated elsewhere, the image layer stack 2500 may be organized through the use of position identifier values assigned to each of the layers and sub layers that make up the image layer stack.

Example Database

Some embodiments includes the various databases (e.g., digital content database 113, and image layer stack database 121) being relational databases, or, in some cases, On Line Analytic Processing (OLAP)-based databases. In the case of relational databases, various tables of data are created and data is inserted into and/or selected from these tables using SQL, or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data.

The tables or cubes made up of tables, in the case of, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms include Boyce-Codd Normal Form or some other normalization, or optimization algorithm known in the art.

Figure 26:
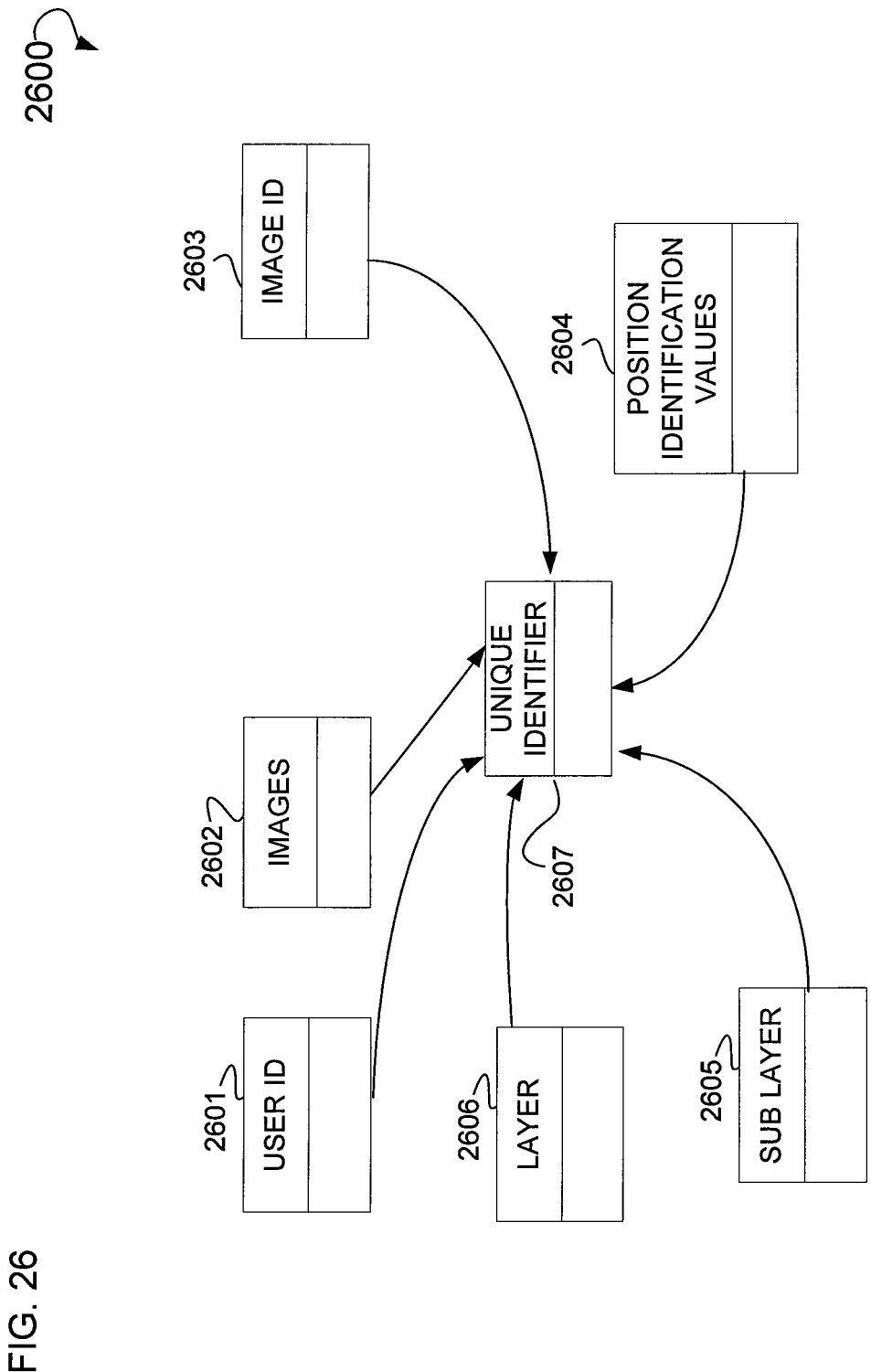
FIG. 26 is a diagram of a Relational Data Schema (RDS), according to an example embodiment.

FIG. 26 is a diagram of an example Relational Data Schema (RDS) 2600. The RDS 2600 may be used in the databases 113 and 121. Shown are various tables including table 2601 including user ID information. This user ID information may be some type of GUID value associated with a particular user, such as user 101 and/or user 209. Further, the user IDs included within this table 2601 may be in the form of a network handle or other uniquely identifying string value used to uniquely identify the user 101 and/or user 209 within a social network. In some example embodiments, data types including an integer or string or other suitable data type may be used in conjunction with the table 2601. Also shown is a table 2602 that includes images. These images may be in the form of images stored as a Binary Large Object (BLOB) and associated image format including JPEG, MPEG, TIF, PNG, or GIF. Further, a table 2603 is shown including image IDs. These image IDs may be in the form of a GUID value and an integer data type associated with these GUID values to uniquely identify an image. These image IDs may be included as a part of the layering instruction 108 or layering instruction 204. Further, shown is a table 2604 including image position identification values. These position identification values include a numeric value assigned to an image that may denote a priority for that image in a layered image or when combined into a layered image. An integer or other suitable data type may be used to denote an image layering priority as shown for table 2604. Also shown is a table 2605 that includes sub layers (e.g., sub layer data) stored as a BLOB and associated image format including JPEG, MPEG, TIF, PNG, or GIF. Further, a table 2606 is shown that includes layers (e.g., layer data) stored as a BLOB and associated image format including JPEG, MPEG, TIF, PNG, or GIF. Table 2607 includes a unique identifier in the form of an integer data type used to uniquely identify the various data entries included within the tables 2601 through 2606.

Component Design

Some example embodiments include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments include remote procedure calls being used to implement one or more of the above-illustrated components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in JAVA™. Suitable protocols include SOAP, CORBA, and other protocols well-known in the art.

A System of Transmission Between a Server and Client

Some embodiments may utilize the Open Systems Interconnection Basic Reference (OSI) model or TCP/IP protocol stack model for defining the protocols used by a network to transmit data. For example, operations 1904, 1905, 1907, 1908, 1910, 1911, 1913, and 1914 may use these protocols. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

Figure 27:
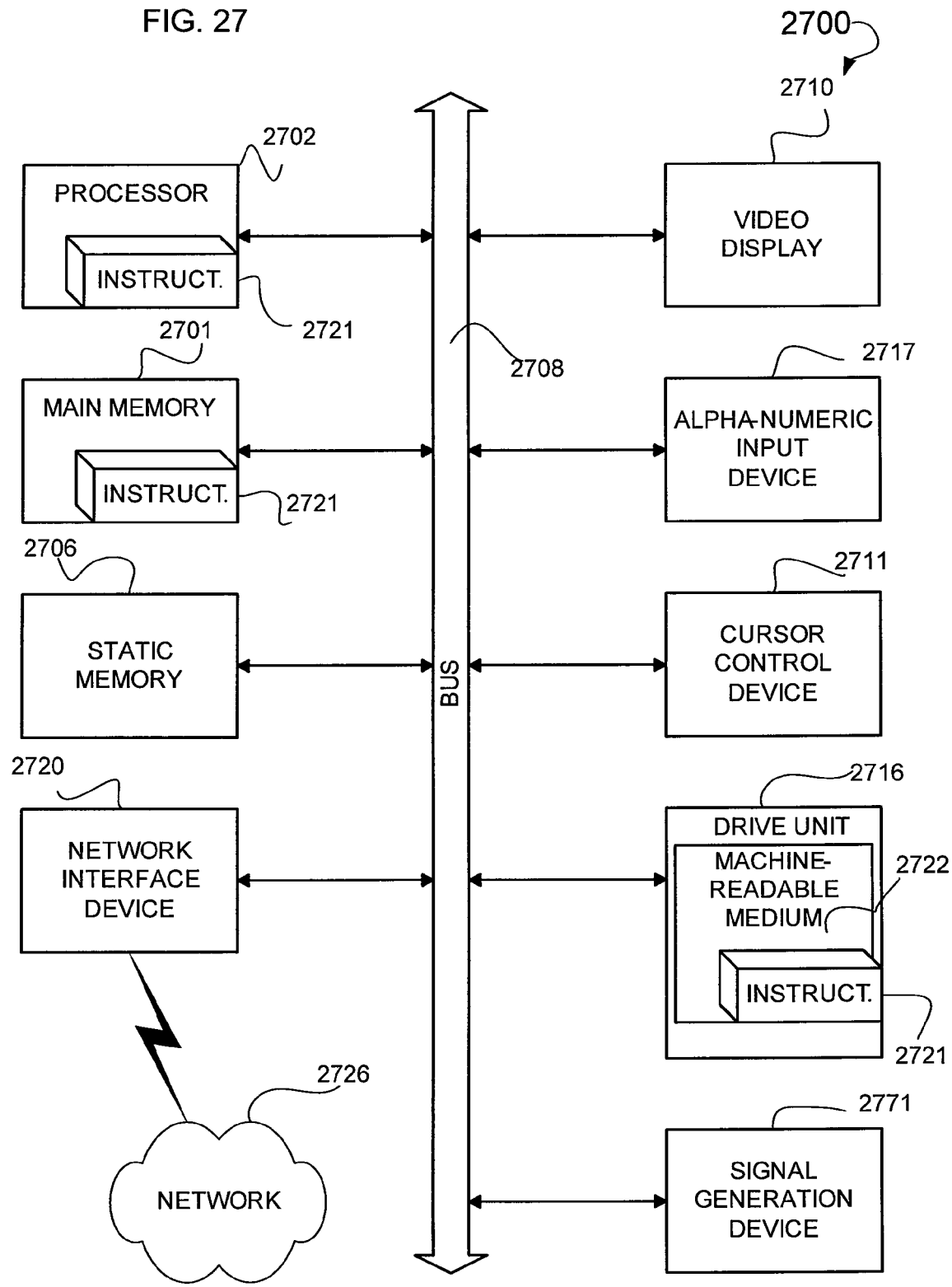
FIG. 27 shows a diagrammatic representation of a machine in the example form of a computer system that executes a set of instructions to perform any one or more of the methodologies discussed herein.

FIG. 27 shows a diagrammatic representation of a machine in the example form of a computer system 2700 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2700 includes a processor 2702 (e.g., a CPU, a Graphics Processing Unit (GPU) or both), a main memory 2701, and a static memory 2706, which communicate with each other via a bus 2708. The computer system 2700 may further include a video display unit 2710 (e.g., a Liquid Crystal Display (LCD) or a Cathode Ray Tube (CRT)). The computer system 2700 also includes an alpha-numeric input device 2717 (e.g., a keyboard), a UI cursor controller 2711 (e.g., a mouse), a drive unit 2716, a signal generation device 2771 (e.g., a speaker) and a network interface device (e.g., a transmitter) 2720.

The disk drive unit 2716 includes a machine-readable medium 2722 on which is stored one or more sets of instructions and data structures (e.g., software) 2721 embodying or used by any one or more of the methodologies or functions illustrated herein. The software instructions 2721 may also reside, completely or at least partially, within the main memory 2701 and/or within the processor 2702 during execution thereof by the computer system 2700, the main memory 2701 and the processor 2702 also constituting machine-readable media.

The instructions 2721 may further be transmitted or received over a network 2726 via the network interface device 2720 using any one of a number of well-known transfer protocols (e.g., HTTP, or Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some example embodiments, a system and method are illustrated to generate an image layer stack. This image layer stack may include a layer and a sub layer. A position identification value may be assigned to the layer and one or more sub layers to establish a priority in the image layer stack. Additionally, a filter may be applied to filter the sub layer and to reveal the layer. The system and method shown herein may be applied in a web based environment as implemented with a social networking server.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
receiving a layering instruction generated based on user input, the layering instruction including an image, the image including a layer, the layering instruction identifying a portion of the layer;
generating a sub layer from the portion of the layer identified in the layering instruction, the sub layer having a sub layer property comprising a property of the layer;
editing the sub layer to create an edit, the edit including a change to the property included in the sub layer property; and
storing the edit into the sub layer as an edit associated with the sub layer.

2. The computer implemented method of claim 1, further comprising transmitting a layered image that includes an image layer stack further including the layer and the sub layer.

3. The computer implemented method of claim 2, wherein the image layer stack provides an edit history for the image including the edit.

4. The computer implemented method of claim 1, further comprising generating an additional sub layer from the sub layer.

5. The computer implemented method of claim 1, wherein the sub layer includes an additional sub layer.

6. The computer implemented method of claim 1, wherein the property includes at least one of a pixel value, or a color code value.

7. The computer implemented method of claim 1, further comprising assigning a first position identification value to the layer, and a second position identification value to the sub layer.

8. A computer implemented method comprising:
receiving a layered image that includes an image layer stack, the image layer stack including an image with a layer and a sub layer, and an edit associated with the sub layer; and
displaying the layered image in a display area of a graphical user interface presented on a client device, the displaying of the layered image including a display of the layer, the sub layer and the edit,
wherein the sub layer comprises a portion of the layer and the edit associated with the sub layer comprises an edit to a property of the sub layer, the property of the sub layer inherited from the layer when the sub layer was generated from the layer.

9. The computer implemented method of claim 8, further comprising toggling between the display of the layer and the sub layer of the image layer stack.

10. The computer implemented method of claim 8, further comprising extracting the sub layer from the image layer stack.

11. The computer implemented method of claim 8, further comprising inserting the sub layer into an image layer stack.

12. The computer implemented method of claim 8, further comprising toggling between a display of the layer and sub layer of the image layer stack to identify an edit history for the layered image.

13. A computer system comprising:
a receiver to receive a layering instruction generated based on user input, the layering instruction including an image, the image including a layer, the layering instruction identifying a portion of the layer;
a layer generation engine to generate a sub layer from the portion of the layer identified in the layering instruction, the sub layer having a sub layer property comprising a property of the layer;
an editing engine to edit the sub layer to create an edit, the edit to include a change to the property included in the sub layer property; and
a storage engine to store the edit into the sub layer as an edit associated with the sub layer.

14. The computer system of claim 13, further comprising a transmitter to transmit a layered image that includes an image layer stack that includes the layer and the sub layer.

15. The computer system of claim 14, wherein the image layer stack reflects a history of edits performed on the image in the form of the layer and the sub layer.

16. The computer system of claim 13, further comprising the layer generating engine to generate an additional sub layer from the sub layer.

17. The computer system of claim 13, wherein the sub layer includes an additional sub layer.

18. The computer system of claim 13, wherein the property includes at least one of a pixel value, or a color code value.

19. The computer system of claim 13, further comprising an assignment engine to assign a first position identification value to the layer, and a second position identification value to the sub layer.

20. A computer system comprising:
a receiver to receive a layered image that includes an image layer stack, the image layer stack including an image with a layer and a sub layer, and an edit associated with the sub layer; and
a display to display the layered image in a display area of a graphical user interface presented on a client device, the displaying of the layered image including a display of the layer, the sub layer and the edit,
wherein the sub layer comprises a portion of the layer and the edit associated with the sub layer comprises an edit to a property of the sub layer, the property of the sub layer inherited from the layer when the sub layer was generated from the layer.

21. The computer system of claim 20, further comprising a toggling engine to toggle between the layer and the sub layer of the image layer stack.

22. The computer system of claim 20, further comprising an extraction engine to extract the sub layer from the image layer stack.

23. The computer system of claim 20, further comprising an insertion engine to insert the sub layer into an image layer stack.

24. The computer system of claim 20, further comprising a toggling engine to toggle between the layer and sub layer of the image layer stack to identify an edit history for the layered image.

25. An apparatus comprising:
means for receiving a layering instruction generated based on user input, the layering instruction including an image, the image including a layer, the layering instruction identifying a portion of the layer;
means for generating a sub layer from the portion of the layer identified in the layering instruction, the sub layer to having a sub layer property comprising a property of the layer;
means for editing the sub layer to create an edit, the edit to include a change to the property included in the sub layer property; and
means for storing the edit into the sub layer as an edit associated with the sub layer.

26. A non-transitory machine-readable medium comprising instructions, which when implemented by one or more machines, cause the one or more machines to perform the following operations:
- receiving a layering instruction generated based on user input, the layering instruction including an image, the image including a layer, the layering instruction identifying a portion of the layer;
- generating a sub layer from the portion of the layer identified in the layering instruction, the sub layer to having a sub layer property comprising a property of the layer;
- editing the sub layer to create an edit, the edit including a change to the property included in the sub layer property; and
- storing the edit into the sub layer as an edit associated with the sub layer.

* * * * *